United States Patent
Wu et al.

(10) Patent No.: US 10,609,862 B2
(45) Date of Patent: Apr. 7, 2020

(54) SELF-MOVING ROBOT

(71) Applicant: Positec Technology (China) Co., Ltd., Suzhou, Jiangsu Province (CN)

(72) Inventors: Xinyu Wu, Shenzhen (CN); Ruiqing Fu, Shenzhen (CN); Huiwen Guo, Shenzhen (CN); Shuanglong Wu, Suzhou (CN); Yong Shao, Suzhou (CN); Gen Sun, Suzhou (CN)

(73) Assignee: POSITEC TECHNOLOGY (CHINA) CO., LTD., Suzhou, Jiangsu (CN)

( * ) Notice: Subject to any disclaimer, the term of this patent is extended or adjusted under 35 U.S.C. 154(b) by 260 days.

(21) Appl. No.: 15/513,106

(22) PCT Filed: Sep. 23, 2015

(86) PCT No.: PCT/CN2015/090468
§ 371 (c)(1),
(2) Date: Jun. 6, 2017

(87) PCT Pub. No.: WO2016/045593
PCT Pub. Date: Mar. 31, 2016

(65) Prior Publication Data
US 2018/0125003 A1 May 10, 2018

(30) Foreign Application Priority Data

Sep. 23, 2014 (CN) .......................... 2014 1 0490228
Sep. 23, 2014 (CN) ...................... 2014 2 0548665 U
(Continued)

(51) Int. Cl.
*A01D 34/00* (2006.01)
*G06K 9/46* (2006.01)
(Continued)

(52) U.S. Cl.
CPC ........... *A01D 34/008* (2013.01); *A01D 34/00* (2013.01); *G01S 17/023* (2013.01); *G01S 17/89* (2013.01);
(Continued)

(58) Field of Classification Search
None
See application file for complete search history.

(56) References Cited

U.S. PATENT DOCUMENTS 5,187,663 A    2/1993  Kamimura et al.
5,528,888 A *  6/1996  Miyamoto ........... A01B 69/008
                                              56/10.2 F
(Continued)

FOREIGN PATENT DOCUMENTS

DE    102008014912    9/2009
DE    102013100192    7/2014
(Continued)

*Primary Examiner* — Truc M Do
(74) *Attorney, Agent, or Firm* — Stoel Rives LLP

(57) ABSTRACT

The invention discloses a self-moving robot, comprising a light emitter, emitting light in a specific wavelength range to the ground; an image capturing device, matched with the light emitter to receive the light in a specific wavelength range to form an image based on the light in a specific wavelength range; and the controller comprises a ground type recognizing module, which extracts features in the image to recognize the ground type in the image. By disposing the light emitter and the image capturing device which are matched to emit and receive the light in a specific wavelength range, an influence of the ambient light on the image is reduced, such that the self-moving robot can accurately recognize the ground type at every moment and in every location, even at night when there is no light source.

15 Claims, 21 Drawing Sheets

(30) Foreign Application Priority Data

| Oct. 10, 2014 | (CN) | 2014 1 0531448 |
| Feb. 10, 2015 | (CN) | 2015 1 0070020 |
| May 14, 2015 | (CN) | 2015 1 0246561 |

(51) Int. Cl.
| | |
|---|---|
| G05D 1/02 | (2020.01) |
| G01S 17/89 | (2020.01) |
| G06K 9/20 | (2006.01) |
| G06K 9/52 | (2006.01) |
| G01S 17/93 | (2020.01) |
| G06K 9/00 | (2006.01) |
| G01S 17/02 | (2020.01) |
| G03B 21/20 | (2006.01) |
| G01N 21/84 | (2006.01) |
| A01D 101/00 | (2006.01) |

(52) U.S. Cl.
CPC ......... *G01S 17/936* (2013.01); *G03B 21/204* (2013.01); *G03B 21/2013* (2013.01); *G05D 1/0242* (2013.01); *G05D 1/0246* (2013.01); *G06K 9/00664* (2013.01); *G06K 9/2027* (2013.01); *G06K 9/4652* (2013.01); *G06K 9/4671* (2013.01); *G06K 9/522* (2013.01); *G06K 9/527* (2013.01); *A01D 2101/00* (2013.01); *G01N 2021/8466* (2013.01); *G05D 2201/0208* (2013.01)

(56) References Cited

U.S. PATENT DOCUMENTS

| | | | |
|---|---|---|---|
| 5,682,313 | A | 10/1997 | Edlund et al. |
| 5,942,869 | A | 8/1999 | Katou et al. |
| 6,076,025 | A | 6/2000 | Ueno et al. |
| 6,493,613 | B2 | 12/2002 | Peless et al. |
| 6,728,607 | B1 | 4/2004 | Anderson |
| 7,555,363 | B2 * | 6/2009 | Augenbraun ........... A47L 5/225 134/18 |
| 8,031,086 | B2 | 10/2011 | Thacher et al. |
| 8,046,103 | B2 | 10/2011 | Abramson et al. |
| 8,060,306 | B2 | 11/2011 | Puhalla et al. |
| 8,306,659 | B2 | 11/2012 | Abramson et al. |
| 8,433,468 | B2 | 4/2013 | Johnson et al. |
| 8,635,015 | B2 | 1/2014 | Anderson |
| 8,666,550 | B2 | 3/2014 | Anderson et al. |
| 8,874,269 | B2 | 10/2014 | Biber et al. |
| 2002/0153185 | A1 | 10/2002 | Song et al. |
| 2004/0088080 | A1 | 5/2004 | Song |
| 2005/0005586 | A1 * | 1/2005 | Schmidt ............... A01D 34/54 56/7 |
| 2005/0010331 | A1 * | 1/2005 | Taylor ................. G05D 1/0219 700/245 |
| 2005/0075784 | A1 | 4/2005 | Gray et al. |
| 2007/0003107 | A1 | 1/2007 | Wei et al. |
| 2007/0267570 | A1 | 11/2007 | Park et al. |
| 2008/0183349 | A1 * | 7/2008 | Abramson ............ G05D 1/0265 701/23 |
| 2008/0219508 | A1 | 9/2008 | Ganguli et al. |
| 2008/0310682 | A1 * | 12/2008 | Lee ..................... G01S 1/70 382/106 |
| 2009/0183478 | A1 * | 7/2009 | Bernini ................. A01D 34/008 56/10.2 A |
| 2009/0299524 | A1 | 12/2009 | Evans et al. |
| 2010/0268385 | A1 | 10/2010 | Rew et al. |
| 2010/0305752 | A1 | 12/2010 | Abramson |
| 2011/0046780 | A1 | 2/2011 | Anderson |
| 2011/0150348 | A1 | 6/2011 | Anderson |
| 2011/0153072 | A1 | 6/2011 | Anderson |
| 2011/0153136 | A1 | 6/2011 | Anderson |
| 2011/0153338 | A1 | 6/2011 | Anderson |
| 2011/0166701 | A1 | 7/2011 | Thacher et al. |
| 2011/0166705 | A1 | 7/2011 | Anderson et al. |
| 2011/0190931 | A1 | 8/2011 | Anderson et al. |
| 2011/0198136 | A1 * | 8/2011 | Teague ................. A01D 34/824 180/19.1 |
| 2011/0202224 | A1 * | 8/2011 | Thompson ........... G05D 1/0227 701/26 |
| 2011/0234153 | A1 | 9/2011 | Abramson |
| 2011/0295423 | A1 | 12/2011 | Anderson |
| 2011/0295424 | A1 | 12/2011 | Johnson et al. |
| 2012/0023880 | A1 | 2/2012 | Messina et al. |
| 2012/0023887 | A1 | 2/2012 | Messina et al. |
| 2012/0029752 | A1 | 2/2012 | Johnson et al. |
| 2012/0029754 | A1 | 2/2012 | Thompson et al. |
| 2012/0029755 | A1 | 2/2012 | Johnson |
| 2012/0029756 | A1 | 2/2012 | Johnson et al. |
| 2012/0083961 | A1 | 4/2012 | Sato et al. |
| 2012/0083962 | A1 | 4/2012 | Sato et al. |
| 2012/0083963 | A1 | 4/2012 | Sato et al. |
| 2012/0084020 | A1 | 4/2012 | Maier et al. |
| 2012/0101679 | A1 | 4/2012 | Anderson et al. |
| 2012/0256752 | A1 | 10/2012 | Musser et al. |
| 2013/0025248 | A1 | 1/2013 | Kraft et al. |
| 2013/0190965 | A1 | 7/2013 | Einecke et al. |
| 2013/0212994 | A1 | 8/2013 | Hwang et al. |
| 2013/0317680 | A1 | 11/2013 | Yamamura et al. |
| 2014/0009748 | A1 | 1/2014 | Leonessa |
| 2014/0012418 | A1 | 1/2014 | Johnson et al. |
| 2014/0012453 | A1 | 1/2014 | Johnson et al. |
| 2014/0166047 | A1 * | 6/2014 | Hillen ................. A47L 9/30 134/6 |
| 2014/0240469 | A1 | 8/2014 | Lee et al. |
| 2014/0277691 | A1 * | 9/2014 | Jacobus ............... G06Q 10/087 700/216 |
| 2014/0300707 | A1 | 10/2014 | Viaene et al. |
| 2015/0096276 | A1 * | 4/2015 | Park ................... A01D 34/008 56/10.2 A |
| 2015/0163993 | A1 | 6/2015 | Pettersson et al. |
| 2015/0185322 | A1 | 7/2015 | Haegermarck |
| 2016/0069743 | A1 * | 3/2016 | McQuilkin ........... G01J 3/2803 356/416 |
| 2016/0147230 | A1 | 5/2016 | Munich |
| 2016/0334801 | A1 * | 11/2016 | Ratanaphanyarat ........................ G05D 1/0246 |
| 2016/0353959 | A1 | 12/2016 | Lindhé |
| 2017/0135541 | A1 | 5/2017 | Kwak et al. |

FOREIGN PATENT DOCUMENTS

| | | |
|---|---|---|
| EP | 2656718 A1 | 10/2013 |
| JP | H0217098 | 1/1990 |
| JP | H0584200 A | 4/1993 |
| JP | 2002211433 A | 7/2002 |
| JP | 2002244736 | 8/2002 |
| KR | 20040023420 | 3/2004 |
| WO | 2016103068 | 6/2016 |

\* cited by examiner

SELF-MOVING ROBOT

BACKGROUND

Technical Field

The present invention relates to a field of self-moving robots, in particular to a self-moving robot capable of recognizing a ground type.

Related Art

At present, a working range of the self-moving robot is usually formed by a physical border or an electronic fence, and the physical border is suitable for less occasions; while the electronic fence is troublesome to arrange and extra time or cost is required. Therefore, in the industry, the ground type is intelligently recognized in an image recognizing manner for working in a proper working area correspondingly, for example, an automatic mower is kept working on a grassland by recognizing whether a ground image is the grassland or not and does not leave from the grassland. However, one of the problems of such technology is that enough accuracy can be achieved only in an ideal light source environment. For example, in the twilight or on rainy days, color temperature and intensity of ambient light are both severely deviated from a standard lighting scenario, the color and brightness of an image will be severely distorted correspondingly, as a result, image recognition is failed. For another example, in a case of dark light at night, the self-moving robot cannot even work at all.

SUMMARY

In view of this, an objective of the present invention is to provide a self-moving robot capable of accurately recognizing a ground type.

A technical solution adopted by the present invention to solve the existing technical problem is a self-moving robot, comprising a shell, a driving module, mounted on the shell and driving the shell to move relative to the ground; a working module, mounted on the shell and executing a set working task; and a controller, mounted on the shell and connected with and controlling the driving module and working module to work; the self-moving robot also comprises a light emitter, emitting light in a specific wavelength range to the ground; an image capturing device, matched with the light emitter to receive the light in the specific wavelength range so as to form an image based on the light in the specific wavelength range; and the controller comprises a ground type recognizing module, which extracts features in the image to recognize the ground type in the image.

Further, the self-moving robot is a gardening robot, the ground type recognizing module is a grassland recognizing module, and the ground type in the image recognized by the grassland recognizing module is grassland or non-grassland.

Further, the grassland recognizing module at least comprises one of a dispersion recognizing element, a frequency domain recognizing element and a texture recognizing element.

Further, the image capturing device comprises a light filter layer, which filters light outside the specific wavelength range.

Further, the light emitting is an invisible light emitter.

Further, the light emitter is an infrared light emitter, and the light filter layer is an infrared filter layer.

Further, the light emitter is a visible light emitter, and the light filter layer is a visible light filter layer.

Further, the light emitter is an ultraviolet emitter, and the light filter layer is an ultraviolet filter layer.

Further, the light emitter is a laser emitter.

Further, laser emitted from a light source of the laser emitter is emitted away from the self-moving robot from an opening, and a distance between the light source and the opening is larger than or equal to 3 cm.

Further, the light emitter comprises a line light source.

Further, a plurality of line light sources are disposed.

Further, the light emitter and the image capturing device face towards the same area to be recognized on the ground.

Further, the same area recognized is located on the ground in front of the shell.

Further, the width of a framing range of the image capturing device is larger than or equal to half of the width of the shell.

Further, a plurality of image capturing devices and/or light emitters are disposed.

Further, an isolating part is disposed between the image capturing device and/or the light emitter and the ground.

Furthers, a shield is disposed outside the image capturing device and/or the light emitter.

Further, exposure time of the image capturing device is smaller than 0.1 s.

Further, the controller further comprises a driving control element, which controls a driving direction of the driving module according to a recognized result of the ground type recognizing module.

Further, the self-moving robot is a robot mower, and the working module is a mowing module.

Compared with the prior art, the present invention has the beneficial effects: by disposing the light emitter and the image capturing device which are matched to emit and receive the light in a specific wavelength range, an influence of the ambient light on the image is reduced, such that the self-moving robot can accurately recognize the ground type at every moment and in every location, even at night when there is no light source.

The present invention further provides a high-recognizing rate method for recognizing a grassland based on an image.

The technical solution adopted by the present invention to solve the existing technical problem is: an image-based method for recognizing a grassland, comprises the following steps: S0. obtaining image blocks to be recognized; S1. processing the image blocks to obtain a tone map and a grey-scale map of the image blocks; S2. from the tone map, extracting at least one specific tone feature value related to grassland features; S3. performing frequency domain transformation on the grey-scale map to extract at least one specific frequency domain feature value related to the grassland features; S4. executing at least one of the following substeps S41, S42, S43 and S44: S41. applying a Haar-like template to the grey-scale map to extract at least one specific Haar-like feature value related to the grassland features; S42. performing matrix transformation on the grey-scale map to extract at least one specific matrix statistical feature value related to the grassland features; S43. converting a color space, having a plurality of color channels, of the image blocks to extract at least one specific color channel feature value related to the grassland features of the image blocks; S44. extracting at least one specific local feature value related to the grassland features of the image blocks through a local feature operator; S5. judging whether each of the specific tone feature value and the specific frequency domain feature value extracted in the steps S2, S3 and S4 and at least one of the specific Haar-like feature value, the specific matrix statistical feature value, the specific color channel feature value and the specific local feature value, which are correspondingly included in the substeps executed in S4 are all in a corresponding preset threshold interval, if all yes, recognizing the image blocks to be grassland, otherwise, recognizing the image blocks to be non-grassland.

Further, the at least one specific tone feature value comprises: an average value of tone values of respective pixel points, and/or a ratio of the pixel points of which the tone values are in the preset threshold interval to all pixel points.

Further, in the step S3, a manner of the frequency domain transformation comprises at least one of Fourier transformation and Gabor transformation.

Further, the Fourier transformation specifically comprises: performing Fourier transformation on the grey-scale map to generate frequency domain maps of the same size, respective coordinate locations in the frequency domain maps having respective phase values and amplitude values; and a manner of extracting the specific frequency domain feature value specifically comprises: extracting the phase value and amplitude value of at least one specific coordinate location as a specific frequency domain feature value respectively.

Further, the step S41 specifically comprises: placing at least one preset feature template in the image blocks in at least one preset form for performing Haar-like operation to obtain a Haar-like feature value, the preset form being a preset size and a preset location.

Further, in the step S42, a manner of matrix transformation is at least one of grey-scale co-occurrence matrix transformation and Hu invariant moment transformation.

Further, in the step S43, the color space comprises at least one of an HSV color space, a CMY color space, a Lab color space or a YIQ color space, and the specific color channel feature value is an average value of parameters values of respective pixels on specific color channels.

Further, in step S4, at least two of the substeps S41, S42, S43 and S44 are executed.

Further, the step S0 specifically comprises: obtaining an image of a target, and dividing the image into a plurality of image blocks.

Further, a total number of each of the specific tone feature value and the specific frequency domain feature value extracted in the steps S2, S3 and S4 and at least one of the specific Haar-like feature value, the specific matrix statistical feature value, the specific color channel feature value and the specific local feature value, which are correspondingly included in the substeps executed in S4 is at least 10.

The present invention further provides a lawn maintenance robot, comprising a shell, a driving module, an image capturing device mounted on the shell and a main control module connected to the image capturing device and the driving module to control an automatic walking device to work, and the image capturing device shoots a target area to form an image; the main control module comprises an image block extracting unit, an image block preprocessing unit, a tone feature extracting unit, a frequency domain feature extracting unit and a grassland recognizing unit, and also comprises a Haar-like feature extracting unit, a matrix statistical feature extracting unit and at least one of a color channel feature extracting unit and a local feature operator unit; the image block extracting unit divides the image shot by the image capturing device into a plurality of image blocks; the image block preprocessing unit processes the image blocks to obtain a tone map and a grey-scale map of the image blocks; the tone feature extracting unit extracts at least one specific tone feature value related to grassland features from the tone map; the frequency domain feature extracting unit performs frequency domain transformation on the grey-scale map to extract at least one specific frequency domain feature value related to the grassland features; the Haar-like feature extracting unit applies a Haar-like template to the grey-scale map to extract at least one specific Haar-like feature value related to the grassland features; the matrix statistical feature extracting unit performs matrix transformation on the grey-scale map to extract at least one specific matrix statistical feature value related to the grassland features from the transformed matrix; the color channel feature extracting unit converts a color space, having a plurality of color channels, of the image blocks, to extract at least one specific color channel feature value related to the grassland features; the local feature operator extracts at least one specific local feature value related to the grassland features of the image blocks; the grassland recognizing unit judges whether each of the extracted specific tone feature value and the extracted specific frequency domain feature value and at least one of the specific Haar-like feature value, the specific matrix statistical feature value, the specific color channel feature value and the specific local feature value, which are correspondingly included in the main control module in S4 are all in a corresponding preset threshold interval, if all yes, the image blocks are recognized to be grassland, otherwise, the image blocks are recognized to be non-grassland.

Further, the at least one specific tone feature value comprises: an average value of tone values of respective pixel points, and/or a ratio of the pixel points of which the tone values are in the preset threshold interval to all pixel points.

Further, a manner of the frequency domain transformation comprises at least one of Fourier transformation and Gabor transformation.

Further, the Fourier transformation specifically comprises: performing Fourier transformation on the grey-scale map to generate frequency domain maps of the same size, respective coordinate locations in the frequency domain maps having respective phase values and amplitude values; and a manner of extracting the specific frequency domain feature value specifically comprises: extracting the phase value and amplitude value of at least one specific coordinate location as a specific frequency domain feature value respectively.

Further, the Haar-like feature extracting unit places at least one preset feature template in the image blocks in at least one preset form for performing Haar-like operation to obtain a Haar-like feature value, the preset form being a preset size and a preset location.

Further, a manner of matrix transformation is at least one of grey-scale co-occurrence matrix transformation and Hu invariant moment transformation.

Further, the color space comprises at least one of an HSV color space, a CMY color space, a Lab color space or a YIQ color space, and the specific color channel feature value is an average value of parameters values of respective pixels on specific color channels.

Further, the main control module comprises at least two of the Haar-like feature extracting unit, the matrix statistical feature extracting unit, the color channel feature extracting unit and the local feature extracting unit.

Further, the specific color channel feature value is: an average value of parameters values of respective pixels on the specific color channel.

Further, a total number of each of the extracted specific tone feature value and the extracted specific frequency domain feature value extracted and at least one of the specific Haar-like feature value, the specific matrix statistical feature value, the specific color channel feature value and the specific local feature value, which are correspondingly included in the main control module in S4 is at least 10.

Compared with prior art, the present invention has the beneficial effects: by extracting the specific feature values related to the grassland through a plurality of feature extracting manners, whether the image blocks are the grassland image is comprehensively judged, the accuracy rate is high and the invention is suitable for wide grassland varieties.

Specific to defects of the prior art, the present invention provides a self-moving robot having an image capturing device without outside light interference, which is accurate and convenient in recognition of a working area.

The technical solution of the present invention is realized in such a manner: a self-moving robot, configured to automatically walk and work on the ground, which comprises a shell, a driving module mounted on the shell, an image capturing device shooting a target area and forming an image and a main control module connected to the driving module and the image capturing device to control the self-moving robot to work. The self-moving robot further comprises a shading cover mounted on the shell, comprising a cover body configured to stop outside light from entering, and having an opening facing the ground; and a light source disposed in the cover body; and the image capturing device is disposed in the cover body.

Preferably, the target area is right ahead of the shell.

Preferably, a distance range from the image capturing device to the ground is 0.1-1 m.

Preferably, a visual angle range of the image capturing device is 50-135 degrees.

Preferably, the cover body has a top, and the image capturing device is disposed on the center of the top.

Preferably, the light source comprises main light sources, and two or more main light sources are disposed and are symmetrically disposed around the image capturing device.

Preferably, the light source further comprises a light compensating source, the top is a polygon, and the light compensating source is located on at least one angle of the polygon.

Preferably, the light source is selected from an LED lamp or fluorescent lamp.

Preferably, the cover body has an inner wall provided with a diffuse reflection layer.

Preferably, the shading cover further comprises a flexible part surrounding the cover body and the flexible part extends to the ground and makes a contact with the ground.

Preferably, the self-moving robot is an automatic mower.

The self-moving robot in the present invention shoots an image of the target area by the image capturing device, the shading cover stops outside light from entering the cover body and further prevents from generating an interference on the image of the target area shot by the image capturing device, and the light source in the cover body provides stable light, such that the recognition on the working area is more accurate and convenient.

The present invention further provides an automatic walking device capable of shooting in a large range and having a low misjudgment ratio.

An automatic walking device comprises a machine body and a walking device mounted on the machine body and further comprises:

an image capturing device, disposed on the machine body and comprising more than two cameras for collecting image information of an external environment;

an image splicing circuit, configured to overlap and clip the image information collected by the two cameras to form spliced image information; and a control device, configured to control a walking direction of the walking device according to the spliced image information.

In one of the embodiments, the more than two cameras are respectively located at two sides which are in front of the machine body and symmetric relative to the machine body.

In one of the embodiments, the image splicing circuit comprises:

a converting module, configured to respectively convert the image information collected by the more than two cameras into different image data; and a splicing module, configured to overlap the different image data through logic operation and clip the overlapped image data to form the spliced image information.

In one of the embodiments, the walking device comprises a driving wheel and a driven wheel, the control device controls a walking direction of the driving wheel according to the spliced image information and the driving wheel drives the driven wheel to walk.

In one of the embodiments, the image capturing device further comprises a movable connector, the more than two cameras are connected to the machine body by the movable connector, and the movable connector is configured to adjust collecting angles of the more than two cameras.

An automatic walking device comprises a machine body and a walking device mounted on the machine body and further comprises:

an image capturing device, disposed on the machine body and comprising more than two cameras for collecting image information of an external environment; and a control device, configured to respectively analyze the image information collected by the more than two cameras and fuse analyzed results to control a walking direction of the walking device.

In one of the embodiments, the more than two cameras are respectively located at two sides which are in front of the machine body and symmetric relative to the machine body.

In one of the embodiments, the walking device comprises a driving wheel and a driven wheel, the control device controls a walking direction of the driving wheel according to the spliced image information and the driving wheel drives the driven wheel to walk.

In one of the embodiments, the image capturing device further comprises a movable connector, the more than two cameras are both connected to the machine body by the movable connector, and the movable connector is configured to adjust collecting angles of the more than two cameras.

According to the automatic walking device mentioned above, more than two cameras are mounted to collect image information of the external environment, then the image information collected by the more than two cameras are overlapped and clipped by the image splicing circuit to form spliced image information, that is, a large-range overall image, or the control device respectively analyzes the image information collected by the more than two cameras and fuses the analyzed results to control a walking direction of the walking device, thus, a wide angle camera is not required, therefore, no image distortion occurs and a misjudgment rate is low.

The present invention further provides an intelligent mower capable of effectively reduce a misjudgment rate for vegetation and a control method thereof.

An intelligent mower comprises:

a machine body;

an image capturing unit, disposed on the machine body and configured to collect image information of an external environment;

a standard color part, disposed in a vision field of the image collecting unit;

an image correcting device, configured to compare image information of the standard color part obtained by the image capturing unit with stored standard color data, obtain a color deviated value generated when the image capturing unit collects image information of the external environment, and perform color correction on the image information of the external environment according to the obtained color deviated value; and a control device, configured to control a working state of the intelligent mower according to the image information of the external environment subjected to color correction.

In one of the embodiments, the standard color part is a standard color plate with the color of white or triselected colors of red, green and blue.

In one of the embodiments, the control device comprises a judging module and a main control module.

The judging module is configured to judge whether an object in the external environment is a target vegetation according to the image information; and the main control module is configured to control a working state of the automatic mower according to a judged result of the judging module.

In one of the embodiments, the judging module comprises a feature extracting unit, a calculating unit and a judging unit; and the feature extracting unit is configured to extract image features of the image information; the calculating unit is configured to calculate a similarity between the image features of the image information and standard image features; the judging unit is configured to judge whether the similarity is larger than or equal to a similarity threshold, and if yes, the object in the external environment is target vegetation; and if not, the object in the external environment is not target vegetation.

A control method for an intelligent mower comprises:

collecting image information of an external environment;

obtaining a color deviated value of the external environment of the intelligent mower;

performing color correction on the image information according to the color deviated value;

controlling a working state of the intelligent mower according to the image information of the external environment subjected to color correction;

controlling the intelligent mower to be kept in an original direction to continuously work when the object in the external environment is the target vegetation; and controlling the intelligent mower to stop working or be subjected to direction adjustment to continuously work when the object in the external environment is not the target vegetation.

In one of the embodiments, the steps of obtaining a color deviated value of the external environment of the intelligent mower comprises:

providing a standard color plate with the color of white or triselected colors of red, green and blue;

collecting the image information of the standard color plate with the color of white or triselected colors of red, green and blue; and comparing the image information of the standard color plate with the color of white or triselected colors of red, green and blue with stored standard colors to obtain a color deviated value.

In one of the embodiments, the steps of performing color correction according to the color deviated value specifically comprises:

adjusting a gain of an RGB channel of the image information according to the color deviated value.

In one of the embodiments, the step of controlling a working state of the intelligent mower according to the image information of the external environment subjected to color correction comprises:

extracting image features of the image information;

calculating a similarity between the image features of the image information and standard image features;

judging whether the similarity is larger than or equal to a similarity threshold, if yes, judging that the object in the external environment is the target vegetation, and controlling the intelligent mower to be kept in an original direction to continuously work; and controlling the intelligent mower to stop working or be subjected to direction adjustment to continuously work if the object in the external environment is not the target vegetation.

According to the intelligent mower and the control method thereof mentioned above, the color deviated value of the external environment of the intelligent mower is obtained by disposing the standard color part, such that the image information collected by the image capturing unit can be subjected to color correction according to the color deviated value, the image information subjected to color correction will not be deviated from original true colors, and the misjudgment rate for the vegetation is effectively reduced.

BRIEF DESCRIPTION OF THE DRAWINGS

The objectives, technical solution and beneficial effects of the present invention mentioned above are described in detail through the specific embodiments capable of realizing the present invention below.

The same signs and marks in the drawings and the description are used for representing the same or equivalent parts.

| | | |
|---|---|---|
| 1, self-moving robot; | 4, dock; | 5, working area; |
| 6, border; | 7, non-working area; | 31, controller; |
| 11, shell; | 13, wheel set; | 15, image capturing device; |
| 17, driving module; | 19, working module; | 21, light emitter |
| 23, irradiated area | ABCD, framing range | EF, projected lines |
| 33, energy module; | 35, ground type recognizing module | 37, driving control element |
| 29, shading plate | 31, main control module | 310, image extracting unit |
| 311, image block preprocessing unit | 312, tone feature extracting unit | 313, frequency domain feature extracting unit |
| 314, Haar-like feature extracting unit | 316, grassland recognizing unit | 317, matrix statistical feature extracting unit |
| 318, local feature operator extracting unit | 319, color channel feature extracting unit | 71, island; |
| 131, left wheel; | 132, right wheel; | 133, auxiliary wheel; |
| 20, shading cover | 22, cover body | 26, light source |
| 30, top | 32, opening | 261, main light source |
| 262, light compensating source | 100, machine body | 200, walking device |
| 300, image capturing device | 400, image splicing circuit | 500, control device |
| 301, camera | 320, movable connector | 410, converting module |
| 420, splicing module | 210, driving wheel | 220, driven wheel |
| 600, machine body | 610, driving wheel | 620, driven wheel |
| 630, camera | 700, cutting device | 200, standard color part |
| 401, image correcting device | 510, judging module | 520, main control module |
| 51, feature extracting unit | 514, calculating unit | 516, judging unit |

DETAILED DESCRIPTION

Figure 1:
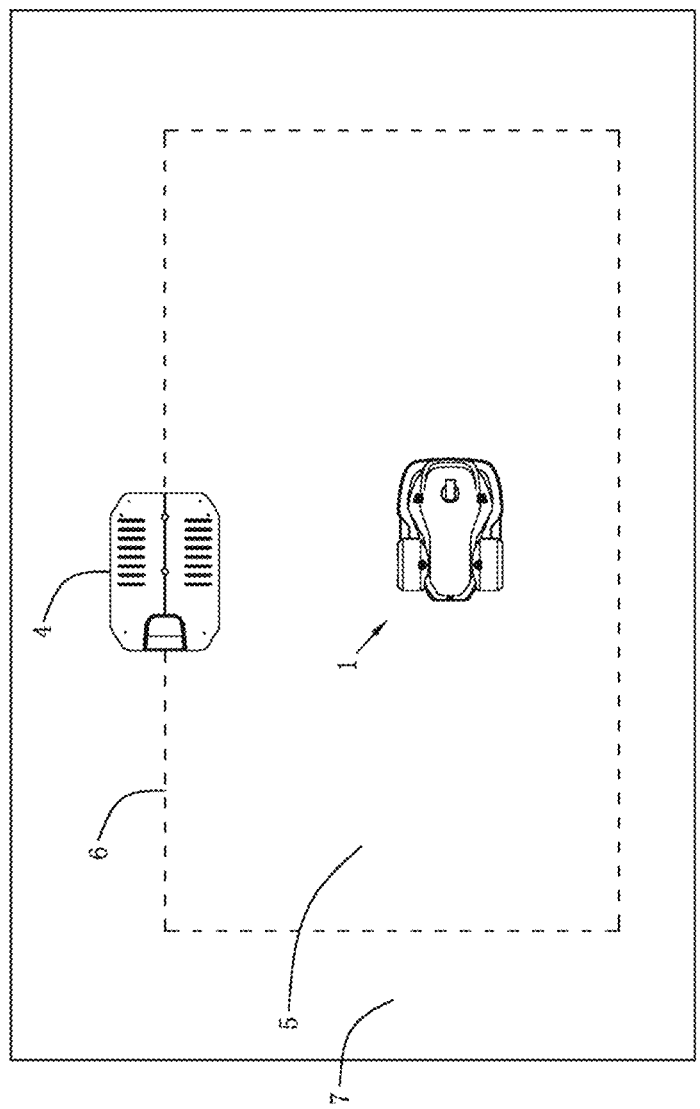
FIG. 1 is a diagram of an automatic working system of a first embodiment of the present invention.

FIG. 1 is a self-moving robot working system of a first embodiment of the present invention.

The self-moving robot working system is disposed the ground, the ground comprises but not limited to an outdoor grassland, land, cement ground and the like; and an indoor floor tile surface, carpet surface, floor surface and the like. In the present embodiment, the ground is divided into a working area 5 and a nonworking area 7, between which a border line forms a border 6. The working area 5 and the nonworking area 7 belong to different types, for example, one is a grassland and the other is non-grassland land or the cement ground. The automatic working system comprises a self-moving robot 1 and a dock 4. The self-moving robot 1 can be an automatic dust collector, an automatic mower, an automatic trimmer and the like. In the present embodiment, the self-moving robot 1 is a gardening robot, and a robot mower more specifically, and the dock 4 is disposed on the border 6 of the working area 5. The self-moving robot judges whether it is in the working area 5 or the nonworking area 7 by recognizing the ground type, so as to keep itself in the working area 5.

Figure 2:
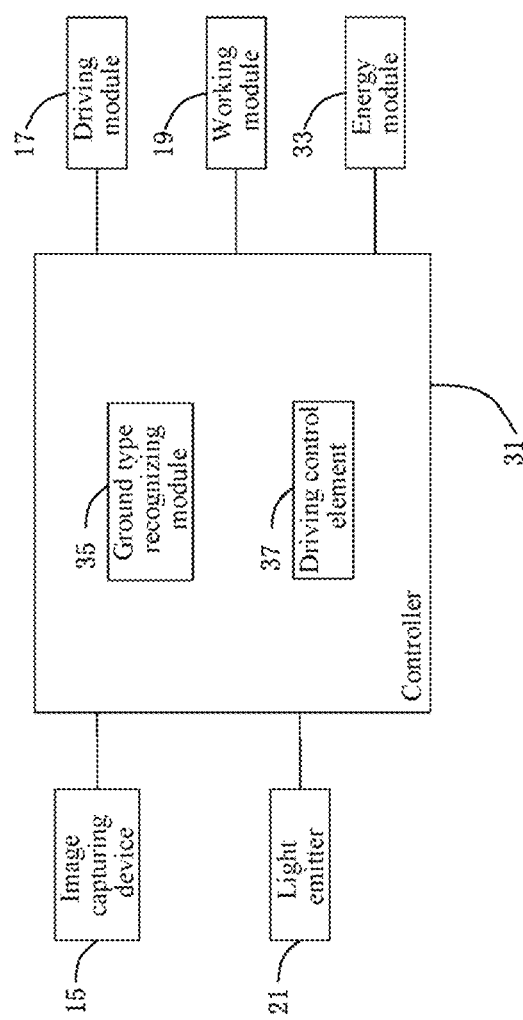
FIG. 2 is a module diagram of a self-moving robot as shown in FIG. 1.

As shown in FIG. 2, the self-moving robot 1 comprises a light emitter 21 and an image capturing device 15, and further comprises a controller 31, a driving module 17, a working module 19 and an energy module 33. The controller 31 comprises a ground type recognizing module 35 and a driving module control unit 37. The controller 31 is connected to the driving module 17, the working module 19, the energy module 33, the image capturing device 15 and the light emitter 21 to control the self-moving robot 1 to carry out various tasks.

The working module 19 of the self-moving robots 1 is mounted on the shell 11, and executes a set work task. In the present embodiment, the working module 19 is a cutting module specifically and comprises a cutting part (not shown) for mowing and a cutting motor (not shown) driving the cutting part.

Figure 3:
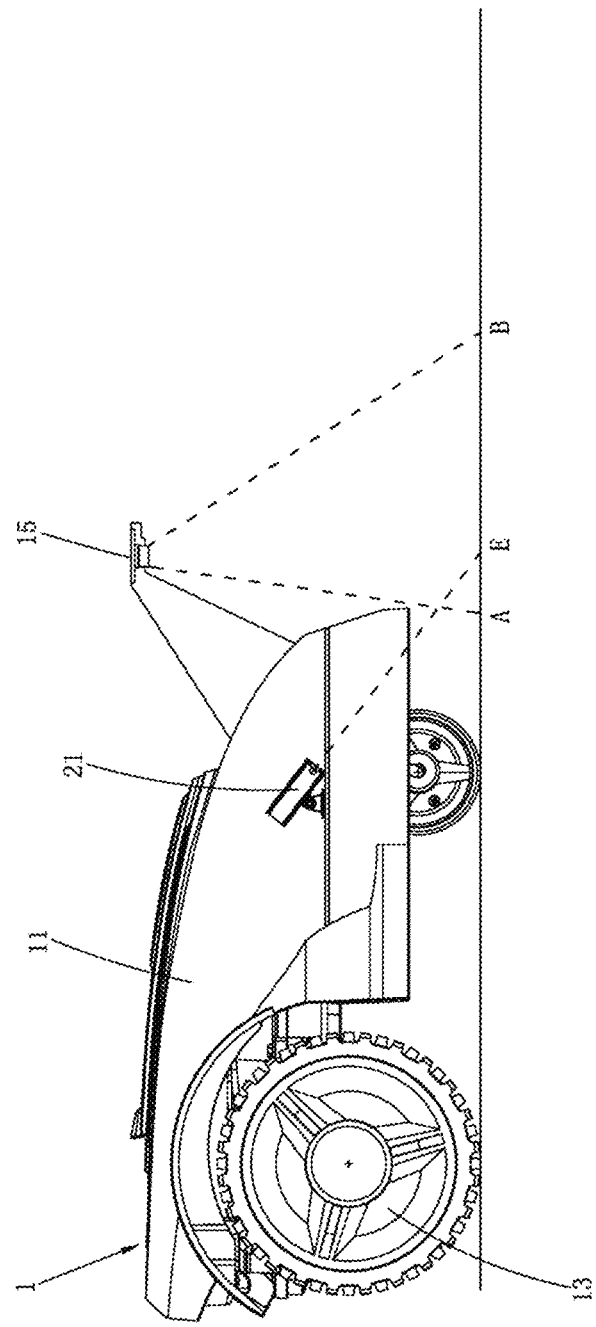
FIG. 3 is a side view of the self-moving robot as shown in FIG. 2.

As shown in FIG. 3, the driving module 17 is mounted on the shell, drives the shell to move relative to the ground and comprises a wheel set 13 and a walking motor driving the wheel set 13. There are many types of disposing methods for the wheel set 13. Usually, the wheel set 13 comprises a driving wheel driven by the walking motor and an auxiliary wheel supporting the shell 11 in an auxiliary manner, and a quantity of the driving wheel can be 1, 2 or more. In the present embodiment, there are 2 driving wheels of the self-moving robot, which are respectively a left wheel on the left and a right wheel on the right. The left wheel and the right wheel are preferably located on the rear part of the shell 11, the auxiliary wheel is located on the front part, and of course, the left and right wheels and auxiliary wheels can be disposed in an exchanging manner in other embodiments.

The energy module 33 is configured to provide energy for operation of the self-moving robot 1. Energy of the energy module 33 can be gasoline, battery pack or the like, and the energy module 33 in the present embodiment comprises a chargeable battery pack disposed in the shell 11. When in work, electric energy released by the battery pack can keep working of the self-moving robot 1. When not in work, the battery can be connected to an external power source to compensate the electric energy. Particularly, in view of a more humanized design, when the electric quantity of the battery is detected to be insufficient, the self-moving robot 1 will automatically seek for the dock 4 for compensating the electric energy.

Reference is continued to be made to FIG. 3, the self-moving robot 1 has a shell 11, and the emitter 21 and the image capturing device 15 are mounted on the shell 11. The light emitter 21 emits light in a specific wavelength range to the ground, the image capturing device 15 is matched with the light emitter to receive the light in a specific wavelength range to form an image based on the light in a specific wavelength range. The light emitter 21 and the image capturing device 15 which are matched are disposed to reduce an influence of ambient light on imaging.

In addition, it should be noted that the image capturing device 15 receives the light in a specific wavelength range, which does not mean that the image capturing device 15 does not receive the light in other wavelength ranges, and the image based on the light in the specific wavelength range does not mean that the image does not include light in other wavelength ranges. This is because it is difficultly realized and unnecessary in engineering to totally filter the light in other wavelength ranges due to performance limitation of other optical materials. The image capturing device 15 is only required to at least partially filter the light outside the specific wavelength range and obviously reduce the interference of the ambient light, while an actual receiving ratio of the light in the specific wavelength range and other pieces of light is determined according to specific application scenarios and a current situation of engineering technology and software algorithms.

In order to protect precise optical components, in an optional solution of the present embodiment, the image capturing device 15 and/or the light emitter 21 are/is provided with a shield, which prevents the image capturing device 15 and/or the light emitter 21 from being stained or damaged. At least part of the shield is transparent to allow the image capturing device 15 to frame or allow the light emitter 21 to project light.

The facing directions of the light emitter 21 and the image capturing device 15 are disposed to be matched, such that light emitted by the light emitter 21 can be reflected back to the image capturing device 15 from the ground. In the present embodiment, the light emitter 21 and the image capturing device 15 both face the same recognized area of the ground, that is, the light emitter 21 projects the recognized area, and the image capturing device 15 shoots an image of the recognized area. Of course, an irradiated range of the light emitter 21 and a framing range of the image capturing device may be different as long as they comprise the same recognized area mentioned above.

In the present embodiment, the light emitter 21 and the image capturing device 15 are both disposed on the front part of the shell 11, the recognized area is located on the ground in front of the shell 11, which is convenient for the self-moving robot 1 to recognize a ground type in an advancing direction thereof.

Specifically, the image capturing device 15 is mounted in a position close to the upper part of the front part of the outer side of the shell 11, and the light emitter 21 is mounted on the front part in the shell 11. The shell 11 has an opening for the light emitter 21 to project light onto the front ground.

In another embodiment, the light emitter 21 and the image capturing device 15 are both mounted in a position close to the upper part of the front part of the outer side of the shell 11, and in a central position preferably, and both face the front lower direction to capture an image of the recognized image on the ground in front of the shell 11. In another optional embodiment, the light emitter 21 and the image capturing device 15 are both mounted on the front end surface of the shell 11, and both face the front lower direction. In the present embodiment, a projection range of the light emitter 21 and a framing range of the image capturing device 15 are both fixed, but can be movable in other optional embodiments.

Figure 4:
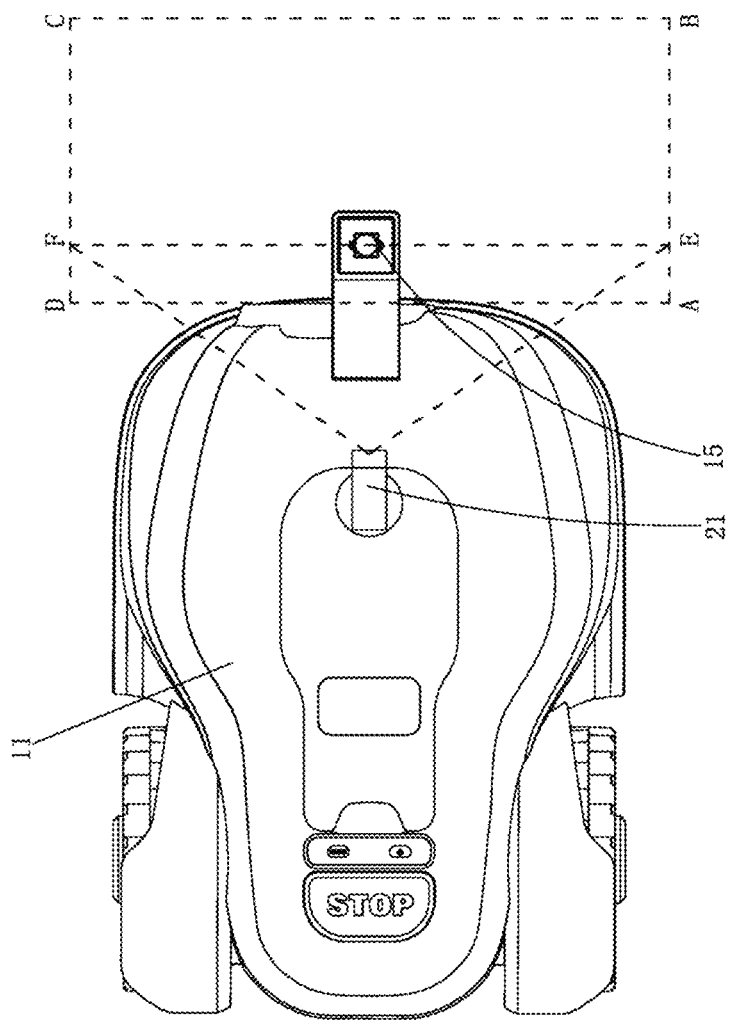
FIG. 4 is a top view of the self-moving robot as shown in FIG. 2.
Figure 5:
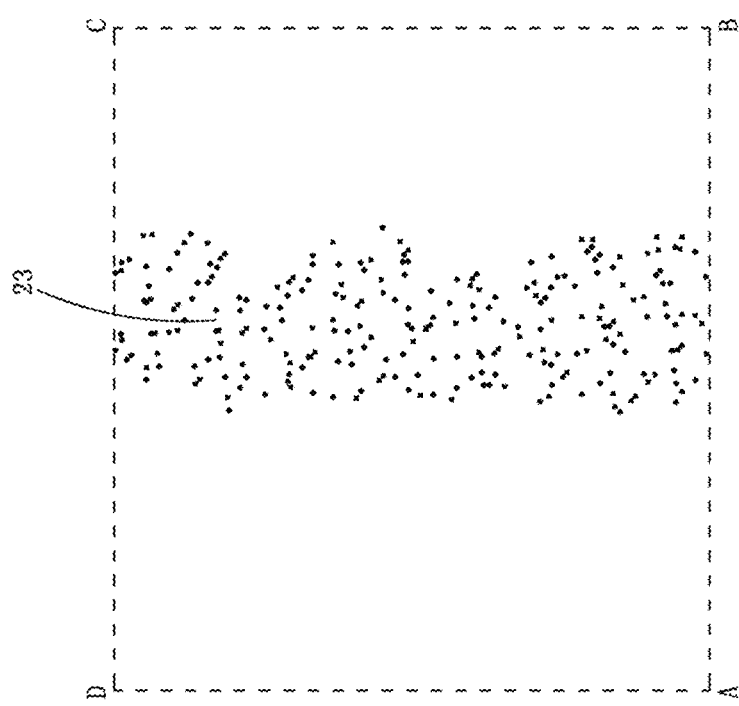
FIG. 5 is a schematic diagram of a shooting area as shown in FIG. 4.
Figure 6:
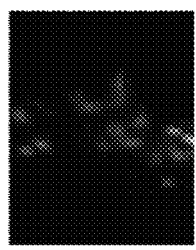
FIG. 6 is an image that a light emitter in FIG. 3 projects light onto a flat ground.
Figure 7:
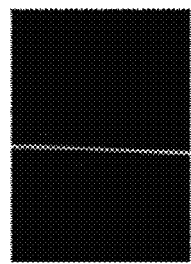
FIG. 7 is an image that the light emitter in FIG. 3 projects light onto a grassland.

The light emitter 21 is a line light source, that is, a projecting line EF as shown in FIG. 4 will be formed if light of the light emitter is projected on a flat surface. It needs to be pointed out that the projecting line EF has certain width in reality, and the line light source means that a geometric shape of the projected light is linear overall. FIG. 6 is an actual picture that the line light source projects light on the flat surface. Since the ground of the working area 5 in the present embodiment is grassland, leaves of the grassland are fluctuated, the light will be projected onto the grass by different actual distances, and the locations on grass surfaces are also different. Therefore, an irradiated area 23 which is prolonged longitudinally and basically fixed transversely as shown in FIG. 5 is formed when the line light source projects light onto the ground. FIG. 7 is an actual picture that the line light source projects light onto the grassland.

The benefit of using the line light source is to obtain a grassland image with special features. The grassland has a spontaneous density interval characteristic, while a pattern formed after the line light source projects a straight line on the grassland reflects such characteristic, it is also equivalent to selective extraction of information in a light projecting direction while other pieces of information are filtered, the pattern is simplified, and a processing load of the controller 31 is reduced.

In an optional embodiment, the laser emitter comprises a plurality of line light sources, which can be disposed in parallel or at an angle. In this way, a processing range can be expanded to process near and far grounds; the probability of wrong recognition can be reduced, for example, the images formed by the plurality of line light sources can be comprehensively processed to obtain a result to improve accuracy; or the images formed by the plurality of line light sources are processed respectively to comprehensively judge the front ground type according to a plurality of results.

In other optional embodiments, the light emitter 21 can also be an area light source, that is, a surface will be formed if the light is projected on a flat surface. At this point, the projection range of the light emitter is a surface on the ground, and front and back ends of the surface will form an irregular shape due to fluctuation of the grassland.

As shown in FIGS. 3 and 4, the ABCD area of the framing range of the image capturing device 15 is located on the ground right ahead of the self-moving robot 1 and is spaced from the self-moving robot 1 by a small distance. The middle axis of the framing range ABCD and that of the shell 11 of the self-moving robot 1 are coincided. The width of the framing range ABCD is at least half of the width of the shell 11, in the present embodiment, and the width of the framing range ABCD is slightly larger than that of the self-moving robot 1. In this way, it can be ensured that the self-moving robot 1 can collect the image information of the ground, not far away from the robot, right ahead for the controller 31 to judge the ground type.

The image capturing device 15 has a light filter layer to filter light outside the specific wavelength range, the light filter layer is a light filter singly disposed in the image capturing device, but the filter layer in other embodiments can be a coating film on the camera. As abovementioned, the filter reduces ambient light outside the specific wavelength range, but cannot remove the same completely. That is to say, in one embodiment, wavelengths of light filtered by the light filter are not all but part of wavelengths outside the specific wavelength range; besides, a filtering rate of the light filter on the filtered wavelengths is not one hundred percent.

In the present embodiment, the light emitter is an invisible light emitter, and an interference of the system on the user can be reduced by adopting invisible light, for example, during working on the grassland at night, no light pollution is formed. More specifically, in the present embodiment, the light emitter 21 is an infrared emitter and projects infrared outwards, that is, the specific wavelength range is in a wavelength range of the infrared (760 nm-1 mm), for example, the specific wavelength range is 5-50 μm. Correspondingly, the image capturing device 15 is an infrared image capturing device, the light filter layer is an infrared filter layer to filter light other than the infrared, preferably, filter the light outside the specific wavelength range, for example, correspondingly filter the light outside the range of 5-50 μm.

Since the infrared is a part with lower intensity in common light sources such as sunlight, the selected infrared emitter is convenient for the light filter layer to filter the common light sources such as sunlight as much as possible, and a better effect of reducing interference of the ambient light can be obtained. As abovementioned, the infrared filter layer cannot filter other light one hundred percent, but can obviously reduce the intensity of other light to relieve the interference of the ambient light.

Setting the specific wavelength range in the infrared wavelength range will also bring about other some benefits, for example, as abovementioned, since the infrared is invisible light, a ground type detecting action of the self-moving robot will not affect normal production life of the user.

Of course, in other optional embodiments, the specific wavelength range can also be in a visible light wavelength range (400 nm-760 nm), for example, the specific wavelength range is 500-550 nm; or in an ultraviolet wavelength range (10-400 nm), for example, the specific wavelength range is 50-100 nm. In these optional embodiments, the effect of reducing the interference of the ambient light can be achieved as long as the image capturing device correspondingly filters the light outside the specific wavelength range, that is, correspondingly has an ultraviolet filter or visible light filter.

In the present embodiment, the light emitter 21 is a laser emitter, which projects the laser in the specific wavelength range outwards. The laser emitter is good in directionality and high in intensity, and can highlight the light in the specific wavelength range in the ambient light and improve an imaging effect. In order to reduce a potential risk of the laser emitter on a human body, the laser emitted from a light source of the laser emitter is emitted away from the self-moving robot from an opening, and a distance between the light source and the opening is larger than or equal to 3 cm. If the laser emitter is located in the shell 11, the opening is located on the shell 11; and if the laser emitter is located outside the shell 11, the opening is located in the body of the laser emitter.

In the present embodiment, exposure time of the image capturing device 15 is smaller than 0.1 s. Under such combination, each frame image shot by the image capturing device 15 can receive the light with sufficient intensity, such that a better image can be shot.

In the present embodiment, the controller 31 comprises a ground type recognizing module 35, which receives an image shot by the image capturing device 15, and extracts features in the image to recognize the ground type in the image. The ground type recognizing module 35 is a grassland recognizing module specifically, and the ground type specifically comprises grassland and non-grassland.

Various ground types have respective different characteristics. For example, the grassland is green and has irregular strip textures; while a carpet has a density and netty textures of a certain rule. The ground type recognizing module 35 extracts the features capable of reflecting these characteristics and substitutes into a preset algorithm or model, and judges the ground type according to an operation result.

Specifically, the grassland recognizing module 35 has at least one recognizing element, and each recognizing element executes a corresponding algorithm or model specific to the extracted corresponding feature. In the present embodiment, the ground type recognizing module 35 comprises at least one of a dispersion recognizing element, a frequency domain recognizing element and a texture recognizing element, which are configured to recognize whether a dispersion feature of the ground image is consistent with a preset condition or model, whether a frequency domain feature is consistent with a preset condition or model and whether a texture feature is consistent with a preset condition or model respectively. The dispersion, the frequency domain feature and the texture can be reflected as a Fourier transformation feature value, a Gabor transformation feature value, a Haar-like feature value, a specific matrix statistical feature value, a specific local feature value, etc., mathematically, correspondingly, the grassland recognizing module 35 can comprise a Fourier transformation feature value recognizing unit, a Gabor transformation feature value recognizing unit, a Haar-like feature value recognizing unit, a specific matrix statistical feature value recognizing unit and a specific local feature value recognizing unit.

In one embodiment, the grassland recognizing module 35 has a plurality of recognizing elements to improve recognizing accuracy.

The grassland recognizing module 35 judges whether the ground is grassland or not according to a judged result of each recognizing element based on a preset rule. For example, the preset rule is that when the judged results of all recognizing elements are all consistent, the ground type in the image is judged to be the grassland, and if the judged result of any recognizing element is not consistent, then the ground type in the image is judged to be the non-grassland; or the preset rule can also be that when the judges results of the plurality of recognizing elements are consistent, the ground type in the image is judged to be the grassland, otherwise, the ground type in the image is judged to be the non-grassland. After obtaining the ground type in the image, the grassland recognizing module 35 sends a result to the main control unit of the controller 31 or other parts.

In the present embodiment, the controller 31 comprises a driving control element 37, which controls a driving direction of the driving module 17 according to the recognized result of the ground type recognizing module 35, and by preventing the self-moving robot 1 from being driven toward the non-grassland, the robot is kept in the working area 5. For example, when the grassland recognizing module judges the ground, i.e., the type of the front ground, in the image is the grassland, the driving module 17 is correspondingly controlled to be kept in a current direction to continuously advance; if the grassland recognizing module judges the front ground to be the non-grassland, then the driving module 17 is correspondingly controlled to be steered, and the type of the front ground after steering is judged in real time and the robot does not continuously advance till the front ground is the grassland again.

A second embodiment of the present invention is introduced below.

The structure of the self-moving robot of the second embodiment is basically similar to that of the first embodiment, and also has a working module. The difference is that an isolating part is disposed between the image capturing device 15 and/or the light emitter 21 and the ground.

Specifically, the isolating part isolates the image capturing device 15 and/or the light emitter 21 from the ground in a vertical direction to prevent pollution on the image capturing device 15 and/or the light emitter 21 during working of the working module 19. For example, when the self-moving robot 1 is a robot mower, the working module 19 is a mowing component, the isolating part isolates the image capturing device 15 and/or the light emitter 21 from the ground, so as to prevent grass chips or soil and rocks raised when the mowing component mows from hitting against the image capturing device 15 and/or the light emitter 21. For another example, when the self-moving robot 1 is a robot dust collector, the working module 19 is a dust collecting component, and the isolating part isolates the image capturing device 15 and/or the light emitter 21 from the ground, and the dust or other sundries raised by the dust collecting component are prevented from hitting against the image collector 15 or the light emitter 21.

A third embodiment of the present invention is introduced below.

The structure of the self-moving robot of the third embodiment is basically similar to the first embodiment, the difference is that a plurality of image capturing devices 15 of the self-moving robot 1 are disposed, or a plurality of light emitters 21 are disposed. For example, the self-moving robot 1 can have a plurality of light emitters 21 and image capturing devices 15 in pair one to one, and the faced recognizing areas are not overlapped totally to expand a detection range.

Specifically, in one solution, the front part of the self-moving robot 1 is provided with a plurality of groups of light emitters 21 and image capturing devices 15, and a detection visual angle in front of the self-moving robot 1 is improved to be more than 120° or even 180°; or in another solution, one or more groups of light emitters 21 and image capturing devices 15 are disposed on the front part and at least one of the left side, the right side and the back side of the self-moving robot 1 to detect the types of the grounds in respective directions.

Similarly, each group of light emitters 21 and image capturing devices 15 faces the same recognized area.

Improving the detection range can bring about more advantages, and after more ground information are collected, more flexible path strategies can be adopted to judge a steering moment more accurately. For example, after the light emitter and the image capturing device are disposed in the back, the self-moving robot 1 is able to select a proper direction to retreat when meeting an obstacle or border, and prevented from being retreated out of the border.

A fourth embodiment of the present invention is introduced below.

The structure of the self-moving robot 1 of the fourth embodiment is basically similar to that of the first embodiment, and the difference is that the self-moving robot 1 is a robot ground cleaner.

Types recognized by the ground type recognizing module 35 of the robot ground cleaner comprise one or more of a carpet, floor tile and floor. For example, the ground type capable of being recognized by the ground type recognizing module 35 is the carpet and non-carpet; the recognized ground type is the floor tile or non-floor tile; or the recognized ground type is the floor or non-floor; or the recognized ground type is the carpet, the floor tile and the floor; etc.

Since a wall serves as a natural border, the robot floor cleaner usually does not need to differentiate the working area and the nonworking area. However, after collecting ground type information, a controller 31 of the robot floor cleaner can decide an advancing direction or other working strategies according to the recognized floor type so as to improve working efficiency of floor cleaning.

For example, after recognizing the carpet, the floor and the floor tile, the robot ground cleaner can control itself to work on the carpet in a certain period and work on the floor in a period; or adopt a working mode of walking at a low speed and cleaning the floor with high power when working on the carpet; or adopt a working mode of walking at a high speed and cleaning the floor with low power when working on the floor. There are many possible strategies and are not repeated.

An embodiment of a grassland recognizing method based on an image is introduced in detail below.

A lawn maintenance robot usually works in an environment in an open environment without a physical fence, and thus is necessarily enabled to not depart from the lawn where it works. At present, a productized solution is to dispose a wire on the border, and the lawn maintenance robot senses an electromagnetic signal generated by the wire to judge whether the border is crossed or not. Such solution is relatively simple and reliable technically but needs manual slotting and wiring, which are relatively troublesome and energy-consuming, therefore, other solutions are also tried in the industry, for example, the grassland border is recognized by shooting and analyzing a ground image. But the present image recognizing solutions are not productized, the reasons are different along with factors such as grass seeds, seasons and terrains, specific images of the grassland are changed unendingly, the current image recognizing solutions cannot ensure that various grass conditions can be accurately recognized, as a result, the recognizing rate specific to a conventional grass condition in experiments is high, but various misjudgments occur once the solution is put into actual experiments, and productization is not realized.

Figure 8:
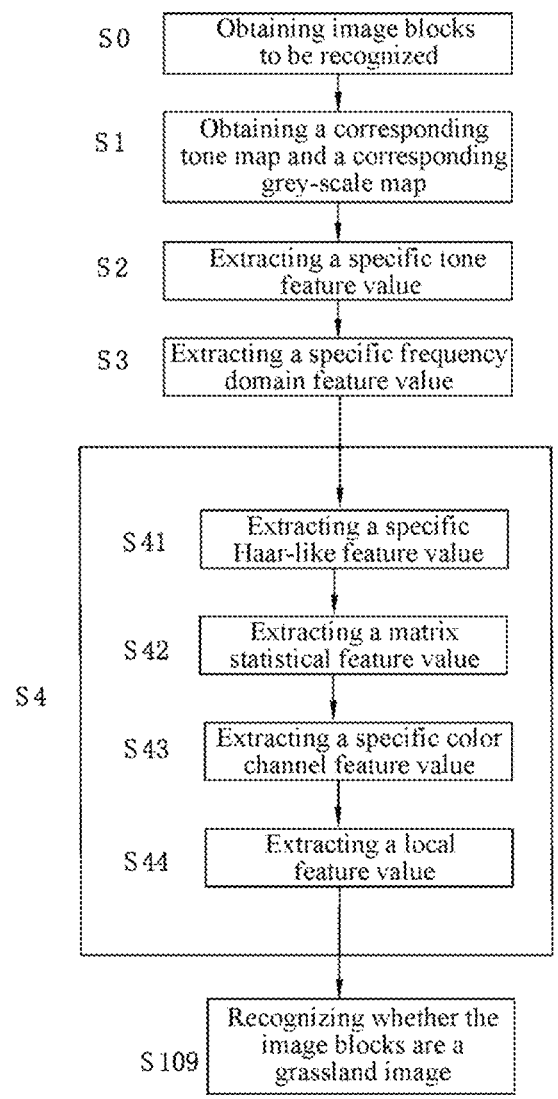
FIG. 8 is a flowchart of a grassland recognizing method of one embodiment of the present invention.

Reference is made to FIG. 8, and the grassland recognizing method based on an image of the present embodiment comprises the following steps:

S0, obtaining image blocks to be recognized.

A specific manner of obtaining the image blocks to be recognized comprises: obtaining images of a target, and dividing the images into a plurality of image blocks. In this step, firstly, an original picture collected and transmitted by an image capturing device is preprocessed and divided into a plurality of image blocks to be recognized with the same size. More specifically, in this step, the original image is subjected to edge cutting to remove parts with possibly inaccurate tones, and then subjected to size compression to be converted to a standard image with the same resolution, then the standard image is subjected to mesh division to obtain a plurality of image blocks without repeated edges, and each image block has the same resolution.

S1, processing the image blocks to obtain a corresponding tone map and grey-scale map.

In this step, if a color format of the image blocks is an RGB format or other non-HSV formats, then the color format of the image block is converted into an HSV format to extract tone information therefrom, the tone map corresponding to the image blocks is obtained, after processing, the size of the tone map and that of the image blocks are the same, and each pixel point of the tone map correspondingly has to a tone value to represent the tone value of each pixel point of the image blocks.

In addition, in this step, the image blocks are also subjected to graying processing to obtain grey-scale information thereof to generate a corresponding grey-scale map which represents the grey-scale value of each pixel point of the image blocks.

S2, from the tone map, extracting at least one specific tone feature value related to grassland features.

Colors of grasses of the lawn are located in a certain tone interval generally, in this step a specific tone feature value related to the grassland features is extracted based on such principle for the following steps to screen related image blocks, and lots of non-grassland images are deleted.

In the present embodiment, the extracted specific tone feature value comprises a tone average value of respective pixel points of the image blocks, in the subsequent judging step S5, if the average value is in a preset threshold interval corresponding to the specific tone feature value, for example, the tone average value of the respective pixel points is between 0-89, then the image blocks are judged to be the grassland image, and if the tone average value is not in the preset threshold interval, then the image blocks are judged to be the non-grassland image. There are many types of specific tone feature values, in another optional solution, the specific tone feature value is a ratio of pixel points of which the tone values are in the preset threshold interval to all pixel points, for example, the ratio of the pixel points with the tone value between 0-89 to all pixel points is larger than 80%. Of course, other proper specific feature values related to the grassland features can be set as the specific tone feature value. A plurality of specific tone feature values can be disposed, for example, a tone average value of respective pixel points of the image blocks and the ratio of the pixel points with the tone values in the preset interval to all pixel points, correspondingly, in the subsequent judging step S5, if any specific tone feature value is not in the corresponding preset threshold interval, then the image blocks are judged to be the non-grassland image.

S3. performing frequency domain transformation on the grey-scale map to extract at least one specific frequency domain feature value related to the grassland features.

In the grassland, intervals among the grasses will generate a regular light and shade change, and such rule can be recognized by performing frequency domain transformation on the grey-scale map. In this step grassland-related features are extracted based on such principle, for the subsequent step S5 to screen and exclude the non-grassland image.

A manner of frequency domain transformation is at least one of Fourier transformation and Gabor transformation. That is, in this step Fourier transformation can be singly used to obtain a frequency domain feature, or singly uses Gabor transformation to obtain the frequency domain feature, or uses the Fourier transformation and the Gabor transformation can be both used to obtain the frequency domain feature.

The method of obtaining the frequency domain feature by using the Fourier transformation comprises: at first, generating a corresponding array matrix according to the grey-scale map, and then performing Fourier transformation on the array matrix of the image. A method for performing two-dimensional Fourier transformation of the image comprises performing the following operations on the corresponding array matrix corresponding to the image:

$$F(u, v) = \frac{1}{N}\sum_{x=0}^{N-1}\sum_{y=0}^{N-1} f(x, y)\exp[-j2\pi(ux+vy)/N]$$

$$f(x, y) = \frac{1}{N}\sum_{u=0}^{N-1}\sum_{v=0}^{N-1} F(u, v)\exp[j2\pi(ux+vy)/N]$$

Wherein, f(x,y) is a grey-scale value of a pixel in a location of x, y, j is an imaginary number and exp is an exponent power operation of a natural number. N is a side length of an image, and u and v are coordinates of a coordinate axis of a frequency domain (similar to an x,y coordinate axes under a cartesian coordinate system).

After Fourier transformation, the grey-scale map is converted into a frequency domain map of the same size, and each coordinate position in the frequency domain map has a phase value and an amplitude value. The whole frequency domain map correspondingly has a phase spectrum and an amplitude value spectrum. The size of each of the phase spectrum and the amplitude value spectrum is N*N, the phase spectrum and the amplitude value spectrum are both converted into a one-dimensional vector (1*N^2), then through Fourier transformation, 2*N^2 frequency domain feature values are extracted from the image blocks.

In this step, the specific frequency domain feature values related to the grassland features are extracted from the plurality of frequency domain feature values.

In this step a plurality of specific frequency domain feature values can be generated for the subsequent step S4 to respectively judge whether these features are in respective preset threshold ranges. In the present embodiment, the phase value and amplitude value of at least one specific coordinate location are extracted to respectively serve as a specific frequency domain feature value for the subsequent step S4 to perform grassland judgment.

For example, whether the phase value of a specific coordinate point (x1, y1) is in an interval (a1, b1) and whether the amplitude value is larger than c1; and whether the phase value of a specific coordinate point (x2, y2) is in an interval (a2, b2) and whether the amplitude value is larger than c2. In such embodiment, the quantity of the specific coordinate points, respective coordinate locations, and a threshold range of respective phase values and amplitude values are selected according to common features of the grassland but are not unique, and there are many selection solutions and combination manners.

The method for obtaining the frequency domain features by adopting Gabor transformation is described below, the frequency domain features obtained by using Gabor transformation are called as Gabor features, and the specific frequency domain feature value extracted therefrom is called as specific Gabor feature value.

Gabor transformation is a short-time Fourier transformation method, and is essentially that a window function is added to Fourier transformation, and time frequency analysis of a signal is realized by the window function. When a Gaussian function is selected as the window function, the short-time Fourier transformation is called as Gabor transformation. A Gabor filter group can better describe local structure information corresponding to a spatial frequency (dimension), spatial position and direction selectivity. Therefore, Gabor can be used to recognize information such as corresponding spatial position and direction of the grassland to judge the grassland.

Specifically, the Gabor filter can be regarded as a template, information required for determining the template comprises a filtering direction, a filtering frequency and an image location. Values of points on the template of the Gabor filter are discrete (i.e., any value besides +1 or −1), and the value is decided according to the filtering direction and filtering frequency. Thus, after the image location is selected, the template of the Gabor filter is covered on the image for operation to obtain lots of Gabor feature values.

Figure 9:
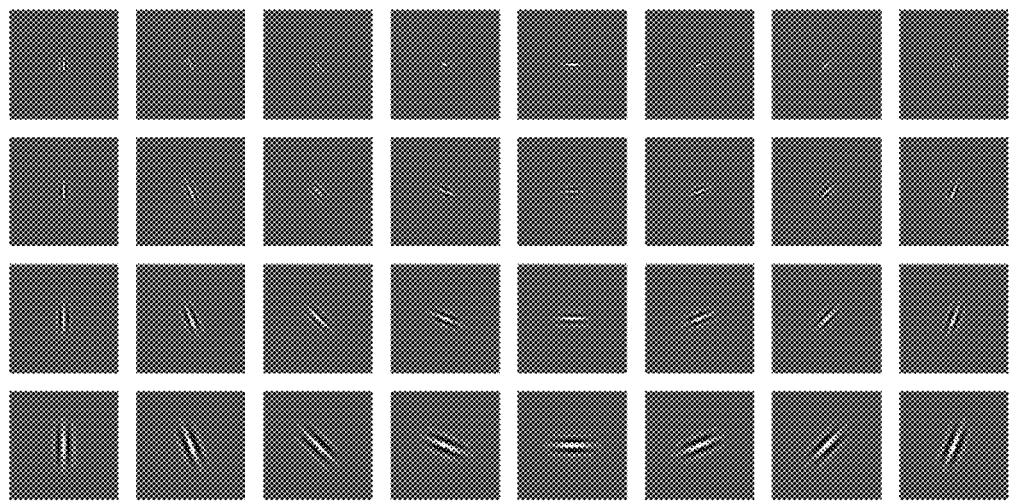
FIG. 9 is a schematic diagram of a Gabor filter group of one embodiment of the present invention.
Figure 10:
FIG. 10 is a schematic diagram of a Haar-like edge feature template of one embodiment of the present invention.
Figure 11:
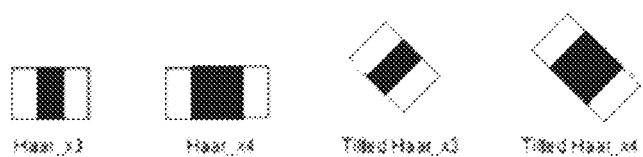
FIG. 11 is a schematic diagram of a Haar-like linear feature template of one embodiment of the present invention.
Figure 12:
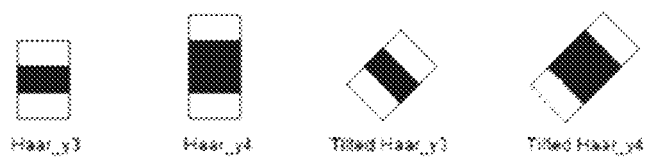
FIG. 12 is a schematic diagram of a Haar-like central feature template of one embodiment of the present invention.
Figure 13:
FIG. 13 is a schematic diagram of a Haar-like diagonal feature template of one embodiment of the present invention.

FIG. 9 shows a Gabor filter group used in the present embodiment. The filter group is generated by permutation and combination of 4 frequencies and 8 filtering directions. In one embodiment, the image location of the Gabor filter group is the whole image, that is, a coordinate range of the template is same with that of processed image blocks.

A generation equation of the Gabor filter is as follows, and the generation equation is generation of the template in fact.

complex number expression:

$$g(x, y; \lambda, \theta, \psi, \sigma, \gamma) = \exp\left(-\frac{x'^2 + \gamma^2 y'^2}{2\sigma^2}\right) \exp\left(i\left(2\pi \frac{x'}{\lambda} + \psi\right)\right)$$

Real number part:

$$g(x, y; \lambda, \theta, \psi, \sigma, \gamma) = \exp\left(-\frac{x'^2 + \gamma^2 y'^2}{2\sigma^2}\right) \cos\left(2\pi \frac{x'}{\lambda} + \psi\right)$$

Imaginary part $$g(x, y; \lambda, \theta, \psi, \sigma, \gamma) = \exp\left(-\frac{x'^2 + \gamma^2 y'^2}{2\sigma^2}\right) \sin\left(2\pi \frac{x'}{\lambda} + \psi\right)$$

wherein $x' = x \cos \theta + y \sin \theta$ and $y' = -x \sin \theta + y \cos \theta$ wherein x, y represent locations of a certain element of the template.

A wavelength ($\lambda$) value is designated by taking a pixel as a unit and is larger than or equal to 2 generally, but cannot be larger than one fifth of the size of an input image.

Direction ($\theta$) designates a direction of parallel stripes of a Gabor function, and has a value of 0-360 degrees.

A value range of phase deviation ($\varphi$) is −180 to 180 degrees, and represents that a middle waveform is deviated to the left or right for a plurality of periods.

Length width ratio ($\gamma$) is spatial longitudinal transverse ratio and decides ellipticity of a shape of the Gabor function. When $\gamma$ equals to 1, the shape is round; and when $\gamma$ is smaller than 1, the shape is prolonged along a direction of the parallel stripes. The value is 0.5 usually.

Bandwidth (b) must be a positive real number and is 1 usually, at this point, a relationship between the standard difference and the wavelength is $\sigma=0.56\lambda$. The smaller the bandwidth is, the larger the standard difference is, and the larger the Gabor shape is.

After the template is applied to the image blocks for operation, similar to Fourier transformation, a phase spectrum and amplitude value spectrum can still be obtained. Still similar to Fourier transformation, each template will generate 2*N^2 Gabor feature values.

After the 2*N^2 Gabor feature values are extracted, whether all feature meet a preset condition does not need to be judged, as long as some specific typical features are required to be selected as specific Gabor values, and whether the Gabor values are in a preset threshold interval are judged in the subsequent step S4.

Similar to Fourier transformation, in this step a plurality of Gabor feature values can be selected, and whether these Gabor feature values are in respective threshold ranges is judged. In the present embodiment, the phase value and amplitude value of at least one specific coordinate location are extracted as one specific Gabor feature value respectively for the subsequent step S5 to judge whether the image blocks are the grassland. For example, whether the phase value of the specific coordinate points (x3, y3) is in an interval (a3, b3), and whether the amplitude value is larger than c3; and whether the phase value of the specific coordinate points (x4, y4) is in an interval (a4, b4), and whether the amplitude value is larger than c4. In the present embodiment, the quantity of the specific coordinate points, respective coordinate locations, and a threshold range of respective phase values and amplitude values are selected according to common features of the grassland but are not unique, and there are many selection solutions and combination manners.

S4, executing at least one of the following substeps S41, S42, S43 and S44. That is, a plurality of specific feature values related to the grassland features are extracted at least through at least one of the Haar-like template application, matrix transformation and color spatial conversion.

S41, applying a Haar-like template to the grey-scale map to extract at least one specific Haar-like feature value related to the grassland features.

The Haar-like feature value is suitable for recognizing an object having an obvious and stable structure as long as the structure is relatively fixed and can still be recognized even subjected to nonlinear deformation such as twisting.

As shown in FIGS. 10-13, the Haar-like features are divided into 4 types: edge features, linear features, central features and diagonal features, each type of features can generate one or more feature templates, white and black matrixes exist in the template, and the feature value of the template is defined as subtraction of a pixel sum of the black rectangle from a pixel sum of the white rectangle. One feature template can be placed in the image blocks in different forms for feature extraction, the size and location of the feature template in the image blocks are variable, and each determined size and location combination is called as one form. Then, under the specific form, grey-scale values of the pixels covered by the feature template in the image blocks are subjected to weighted summation, that is, if a corresponding point on the template is white, then a value of the point is the grey-scale value multiplied by 1, and if a corresponding point on the template is black, then a value of the point is the grey-scale value multiplied by −1. Different feature templates are placed in the image blocks with different sizes and locations, and then lots of Haar-like features are generated. However, when whether the image blocks are the grassland is judged, it is unnecessary to calculate and judge all features one by one, and in one embodiment, only a plurality of typical features need to be extracted as specific Haar-like feature values for the subsequent step S5 to judge.

For example, in one embodiment, the edge feature template Haar_Y2 with a size of 6*6 is placed in the central location of the image, one Haar-like feature value is obtained through the weighing and calculating mentioned above, if the Haar-like feature value is not in a corresponding threshold interval, then the image blocks are judged to the non-grassland image, and if the Haar-like feature value is in a corresponding threshold interval, then whether the image blocks are the grassland image is judged in combination with other features. In other optional embodiments, a plurality of Haar-like features can be generated by different templates and different placing forms, whether respective corresponding preset conditions are met is judged respectively, and if any feature does not meet the corresponding preset condition, then the non-grassland picture is judged to be, and if all preset conditions are met, the grassland picture is judged to be in combination with other types of features.

S42. performing matrix transformation on the grey-scale map to extract at least one specific matrix statistical feature value related to the grassland features.

A manner of matrix transformation is at least one of grey-scale co-occurrence matrix transformation and Hu invariant moment transformation. When the grey-scale co-occurrence matrix transformation is performed, the generated features are specifically called as grey-scale co-occurrence matrix features, and specific feature values extracted therefrom are specific grey-scale co-occurrence matrix feature values. When the Hu invariant moment transformation is performed, the generated features are specifically called as Hu invariant moment features, and specific feature values extracted therefrom are specific Hu invariant moment feature values.

A method for the grey-scale co-occurrence matrix transformation is to constitute any point (x, y) and a point (x+a, y+b) away from any point into a point pair, wherein a and b are random integer offsets. A grey-scale value of the point pair is (f1, f2), then the point (x, y) is moved on the whole image to obtain different (f1, f2) values. A maximal grey scale of the image is L (256 generally), then there are L*L kinds of combinations of f1 and f2. For the whole image, the occurring numbers of all (f1, f2) are counted, then a matrix (the size is L*L) is arrayed, then the total occurring number of (f1, f2) is normalized into an occurring probability P(f1, f2), and the matrix generated thereby is the grey-scale co-occurrence matrix. Each value in the matrix can serve as one grey-scale co-occurrence matrix feature. In this step, at least one grey-scale co-occurrence matrix feature value related to the grassland features is extracted therefrom.

The method of Hu invariant moment transformation is introduced below.

The Hu invariant moment has characteristics of unchanged rotation, translation and dimension, has very good anti-interference property and a processing method is:

$$m_{pq} = \sum_{y=1}^{N} \sum_{x=1}^{M} x^p y^q f(x, y)$$

$$p, q = 0, 1, 2 \ldots$$

$$\mu_{pq} = \sum_{y=1}^{N} \sum_{x=1}^{M} (x - \bar{x})^p (y - \bar{y})^q f(x, y)$$

$$p, q = 0, 1, 2 \ldots$$

N and M are height and width of the image respectively.

$\eta_{qp} = \mu_{pq}/(\mu_{00}^\rho)$; wherein $\rho = (p+q)/2+1$ 7 invariant moments from M1 to M7 are constructed by using a second order and third order normalized center moment:

$M1 = \eta_{20} + \eta_{02}$ $M2 = (\eta_{20} - \eta_{02})^2 + 4\eta_{11}^2$ $M3 = (\eta_{30} - 3\eta_{12})^2 + (3\eta_{21} - \eta_{03})^2$ $M4 = (\eta_{30} + \eta_{12})^2 + (\eta_{21}\eta_{03})^2$ $M5 = (\eta_{30} - 3\eta_{12})(\eta_{30} + \eta_{12})((\eta_{30} + \eta_{12})^2 - 3(\eta_{22} + \eta_{03})^2) + (3\eta_{21} - \eta_{03})(\eta_{21} + \eta_{03})(3(\eta_{30} + \eta_{12})^2 - (\eta_{21} + \eta_{03})^2)$ $M5 = (\eta_{20} - \eta_{02})((\eta_{30} + \eta_{12})^2 - (\eta_{21} + \eta_{03})^2) + 4\eta_{11}(\eta_{30} + \eta_{12})(\eta_{21} + \eta_{03})$ $M7 = (3\eta_{21} - \eta_{03})(\eta_{30} + \eta_{12})((\eta_{30} + \eta_{12})^2 - 3(\eta_{21} + \eta_{03})^2) - (\eta_{30} - 3\eta_{12})(\eta_{21} + \eta_{03})(3(\eta_{30} + \eta_{12})^2 - (\eta_{21} + \eta_{03})^2)$ After the Hu invariant moments are generated, at least one Hu invariant moment feature value related to grassland features is extracted from the Hu invariant moments.

S43. converting a color space, having a plurality of color channels, of the image blocks to extract at least one specific color channel feature value related to the grassland features.

The color space comprises at least one of an HSV color space, a CMY color space, a Lab color space or a YIQ color space, and the specific color channel feature value is an average value of parameters values of respective pixels on specific color channels.

The HSV color space is taken as an example, values of pixels of the H channel are taken and are averaged to obtain one feature, and three feature values can be generated together with the average values of the S channel and the V channel. Other respective formats can also generate plurality of color channel features similarly. This step extracts at least one specific color channel feature value related to the grassland features in these features.

S44, extracting at least one specific local feature value related to the grassland features of the image blocks through a local feature operator.

The local feature operator at least comprises: an LBP operator (Local Binary Pattern), a WLD operator (Weber Local Operator) and an SIFT operator (Scale Invariant Feature Transformation).

S5, judging whether each of the specific tone feature values extracted in the steps S2, S3 and S4 is in a corresponding threshold interval, and if all yes, judging the image blocks to be the grassland image, the specific features comprising a specific tone feature value and a specific frequency domain feature value, and further correspondingly comprising at least one of a specific Haar-like feature value, a specific matrix statistical feature value, a specific color channel feature value and a specific local feature value according to the substeps executed in S5.

Through the steps S2, S3 and S4, the method extracts a plurality of specific feature values related to the grassland features from the image blocks to be processed, in this step, whether the specific feature values are located in a preset threshold interval disposed corresponding to these specific feature values is judged, if the judged result of any specific feature is no, the image blocks are judged to be the non-grassland image, and if the judged results are all yes, the image blocks are judged to be grassland image.

In one optional embodiment, at least two of the substeps in the step S4 are executed, therefore, the specific feature values comprise the specific tone feature value and the specific frequency domain feature value and further comprises at least two of the specific Haar-like feature value, the specific matrix statistical feature value, the specific color channel feature value and the specific local feature value.

Step S5 is explained by executing all substeps in step S4.

In step S5, whether one or more specific tone feature values are in a corresponding preset threshold interval is judged at first. In the preset embodiment, one specific tone feature value is an average value of the tone values of respective pixel points, and a preset threshold interval corresponding to the average value is 0-89. If any specific tone feature value is not in the preset threshold interval, then the image blocks are judged to be the non-grassland image; and if all specific tone feature values are in the corresponding preset threshold intervals, then whether other specific feature values are in the corresponding preset threshold intervals is continuously judged.

If the judged results of all specific tone feature values are yes, then whether one or more specific frequency domain feature values are in the correspondingly disposed preset threshold intervals is judged. The specific frequency domain feature value can be generated by Fourier transformation or Gabor transformation, and can also be generated by both. In the present embodiment, whether a phase value of the specific coordinate point $(x_1, y_1)$ in the phase spectrum is in an interval $(a_1, b_1)$ is judged at first, if the judged result is no, then the image blocks are recognized to be the non-grassland image, and if the judged result is yes, then whether an amplitude value of the specific coordinate point $(x_1, y_1)$ mentioned above is in a preset threshold interval is continuously judged, specifically, whether the amplitude value is larger than $c_1$ is judged. Similarly, if any specific frequency domain feature value is not in the preset threshold interval, then the image blocks are judged to be the non-grassland image; and if all specific frequency domain feature values are in the corresponding preset threshold intervals, then whether other specific feature values are in the corresponding preset threshold intervals is continuously judged.

If the judged results of all specific frequency domain feature values are all yes, then whether one or more Haar-like feature values are in the preset threshold intervals is continuously judged. If any specific Haar-like feature value is not in the preset threshold interval, then the image blocks are judged to be the non-grassland image; and if all specific Haar-like feature values are in the corresponding preset threshold intervals, whether other specific feature values are in the corresponding preset threshold intervals is continuously judged.

If the judged results of all specific Haar-like feature values are all yes, then whether one or more specific matrix statistical feature values are in the preset threshold intervals is continuously judged. The specific matrix statistical feature values can be specific grey-scale co-occurrence matrix feature values or specific Hu variant moment feature values, and can also be both of them. If the judged result of any specific matrix statistical feature value is no, then the image blocks are judged to be the non-grassland image; and if the judged results of all specific matrix statistical feature values are yes, whether other specific feature values are in the corresponding preset threshold intervals is continuously judged.

If the judged results of all specific matrix statistical feature values are all yes, then whether one or more specific color space channel feature values are in the preset threshold intervals is continuously judged. If the judged result of any specific color space channel feature value is no, then the image blocks are judged to be the non-grassland image; and if the judged results of all specific color space channel feature values are yes, whether other specific feature values are in the corresponding preset threshold intervals is continuously judged.

If the judged results of all specific color space channel feature values are all yes, then whether one or more local feature values are in the preset threshold intervals is continuously judged. If the judged result of any local feature value is no, then the image blocks are judged to be the non-grassland image; and if the judged results of all specific local feature values are yes, it is indicated that all specific feature values are judged completely and are in the respectively corresponding preset threshold intervals, at this point, the image block is recognized to be the grassland image.

It should be noted that in the present embodiment, a judging sequence of the respective specific feature values is only exemplary, and can be changed in many forms, and this judging sequence does not affect implementation of the present invention. For example, after whether respective specific color channel feature values are in the correspondingly disposed preset threshold intervals is judged, the condition of each specific Haar-like feature value is judged, and then the condition of each specific frequency domain feature value and the condition of each tone feature value are judged in sequence; or sequencing may not be performed according to categories of the specific features values, for example, the condition of one Haar-like feature value is judged at first, then the condition of one specific tone feature value is judged, and then the condition of one Haar-like feature value is judged, and so on, which is not repeated any more.

In addition, the steps S2, S3 and S4 are introduced in sequence only in order for convenient description, which does not mean a specific executing sequence thereof. S3 can be executed before S2, and specific actions of the S2, S3 and S4 and that of the S5 can be executed in a crossing manner. For example, part of the action of S5 can be executed immediately after the specific tone feature values in S2 are extracted, whether the extracted tone feature values are in the corresponding preset threshold intervals is judged, if not, the image blocks are judged to be the non-grassland image, if yes, operation is returned to step S3 to extract the specific frequency domain feature values, after at least one specific frequency domain feature value is extracted, the step S4 is not executed, and operation is skipped to step S5 to execute an action of judging whether the extracted specific frequency domain feature values are in the corresponding preset threshold intervals, if not, the image blocks are judged to be the non-grassland image, and if yes, operation is returned to step S4 to extract corresponding specific feature values. A specific change form can be easily conceived by those skilled in the art and is not repeated any more.

In order to recognize the grassland as accurate as possible, the grassland-related specific feature values extracted in the embodiments mentioned above are more than 10. Of course, in some embodiments, if the specific feature values are properly selected, its quantity can also be smaller than 10.

A self-moving robot 1, a lawn maintenance robot specifically, of one embodiment of the present invention is introduced below, and as shown in FIG. 1, the lawn maintenance robot belongs to a lawn robot system, located on the ground. In the present embodiment, a grassland 5 and a nonworking area 7 are distributed on the ground, the nonworking area is non-grassland specifically, and a border line between the grassland 5 and the non-grassland forms a border 6. Except for the lawn maintenance robot, the lawn robot system further comprises a dock 4. The lawn maintenance robot can be a robot mower, a robot irrigator, a robot trimmer, etc. In the present embodiment, the lawn maintenance robot is a robot mower, and the dock 4 is disposed on the peripheral border 6 of the working area.

Figure 14:
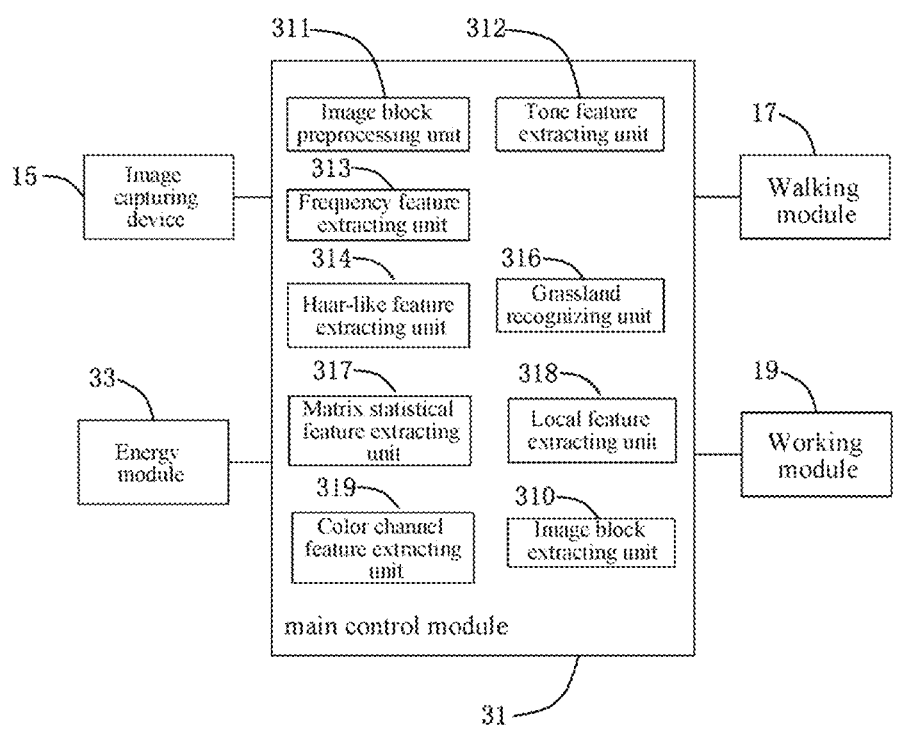
FIG. 14 is a module diagram of an automatic walking device in the automatic working system as shown in FIG. 1.
Figure 15:
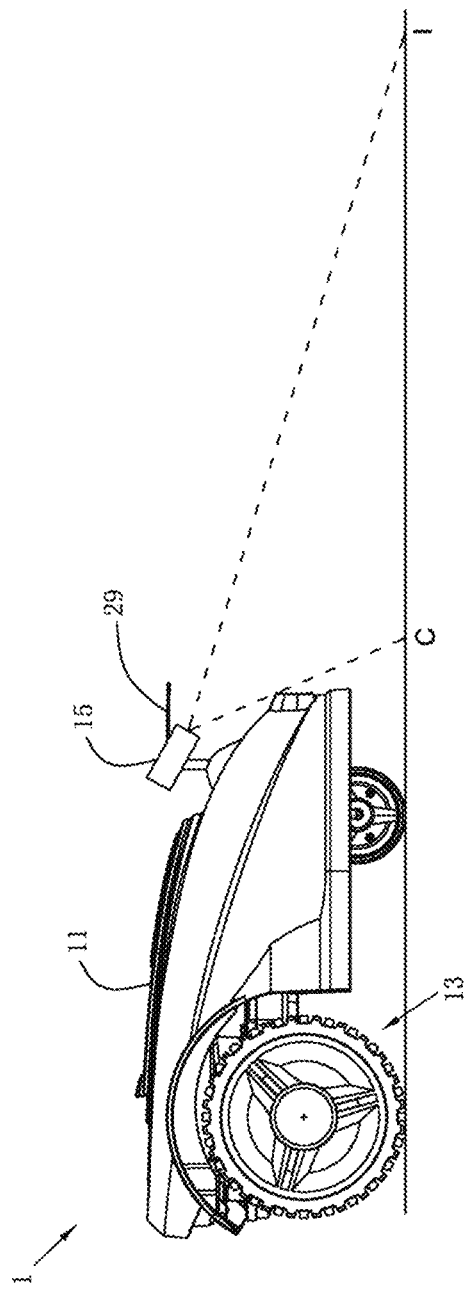
FIG. 15 is a side view of the automatic walking device as shown in FIG. 14.

Reference is made to FIGS. 14 and 15, the lawn maintenance robot has a shell 11 and an image capturing device 15 mounted on the shell 11. The image capturing device 15 shoots an image of an area in front of the lawn maintenance robot.

The lawn maintenance robot further comprises a main control module 31, a driving module 17, a working module 19, an energy module 33 and an ultrasonic detecting device 16. The main control module 31 is connected to the driving module 17, the working module 19, the energy module 33 and the image capturing module 15.

The working module 19 is configured to execute specific work. In the present embodiment, the working module 19 is a cutting module specifically and comprises a cutting component (not shown) and a cutting motor (not shown) for driving the cutting component.

The energy module 33 is configured to provide energy for operation of the lawn maintenance robot. Energy of the energy module 33 can be gasoline, a battery pack and the like, and the energy module 33 in the present embodiment comprises a chargeable battery pack disposed in the shell 2. When in work, electric energy released by the battery pack can keep working of the self-moving robot 1. When not in work, the battery can be connected to an external power source to compensate the electric energy. Particularly, in view of a more humanized design, when the electric quantity of the battery is detected to be insufficient, the self-moving robot 1 will automatically seek for the dock 4 for compensating the electric energy.

The driving module 17 comprises a wheel set 13 and a walking motor driving the wheel set 13. There are many disposing methods for the wheel set 13, which are not specifically described herein.

As shown in FIG. 15, the image capturing device 15 is mounted in a position close to the upper part of the front part of the outer side of the shell 11, and in a central position preferably, and captures an image of an area in front of the shell 11, and the front area at least comprises a target area of the front ground. In the present embodiment, a framing range of the image capturing device 15 is a fixed area, for example, a fixed visual angle range is 90-120 degrees. In other optional embodiments, the framing range is movable, a certain angle range in the visual angle range can be selected as the actual framing range, for example, the 90-degree range in the middle of the visual angle range of 120 degrees is selected as the actual framing range.

Figure 16:
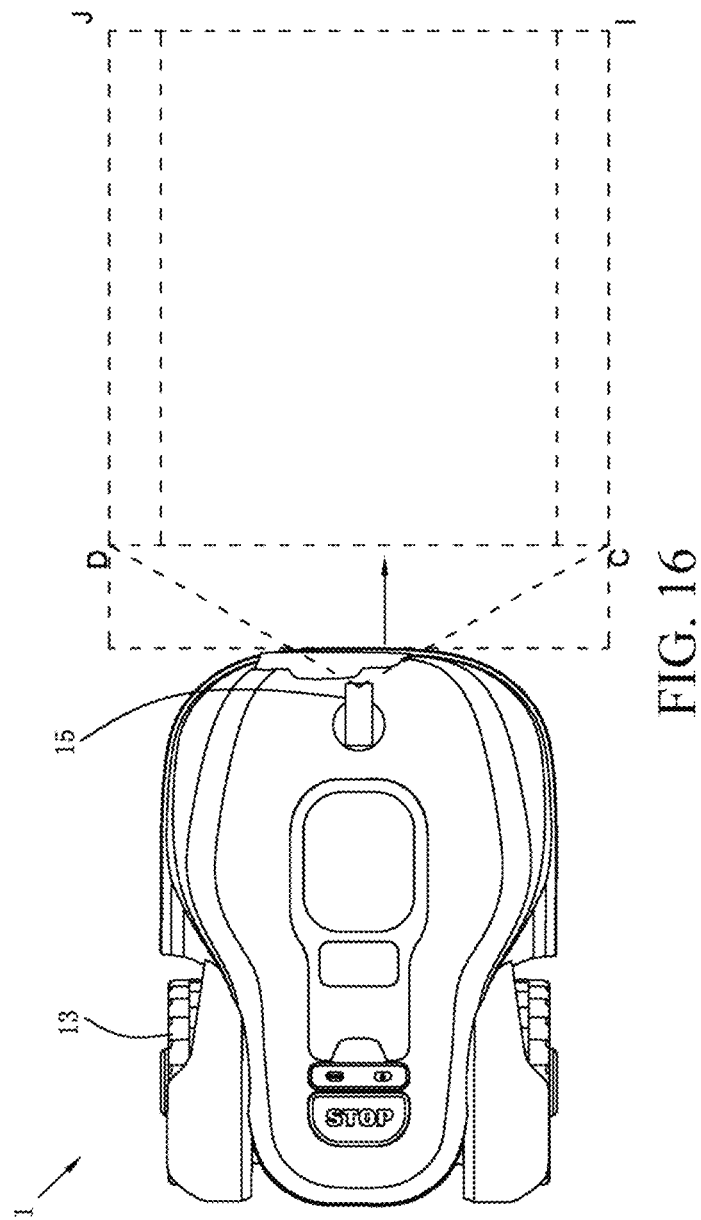
FIG. 16 is a schematic diagram of a shooting area of the automatic walking device as shown in FIG. 14.

The target area included in the framing range of the image capturing device 15 is a rectangular DCIJ area in FIG. 16, which is located on the ground right ahead of the lawn maintenance robot, and is spaced from the lawn maintenance robot by a small distance. A middle axis of the DCIJ area and that of the shell 11 of the lawn maintenance robot are coincided, and a width of the DCIJ area is slightly larger than that of the lawn maintenance robot. Thus, it can be ensured that the lawn maintenance robot can collect the image information of the ground, not far away from the robot, right ahead for a main control module 31 to judge attributes thereof.

A whole framing range of the image capturing device 15 can be larger than the DCIJ area, for example, further comprises an area above the ground, in such a case, the main control module 31 will extract predetermined image blocks corresponding to the DCIJ area in the complete image captured by the image capturing device 15 for ground attribute analysis; and the whole framing range of the image capturing device 15 can also just equal to the DCIJ area, at this point, the complete image captured by the image capturing device 15 is the predetermined image block corresponding to the DCIJ area.

Reference is made to FIG. 15 again, a shading plate 29 is further disposed above the image capturing device 15, horizontally extends outwards from the top of the image capturing device 15 to prevent sunlight from irradiating the image capturing device 15 to cause overexposure, and can also shield the image capturing device 15 from rainwater.

Reference is made to FIG. 16, the main control module 31 comprises an image block extracting unit 310, an image block preprocessing unit 311, a tone feature extracting unit 312, a frequency domain feature extracting unit 313, a Haar-like feature extracting unit 314, a matrix statistical feature extracting unit, a color channel feature extracting unit and a grassland recognizing unit 316.

The image capturing device 15 transmits a captured original image to the main control module 31, and the image block extracting unit 310 of the main control module 31 processes the original image into image blocks to be recognized.

The image block extracting unit 310 preprocesses the original image captured and transmitted by the image capturing device 15, the image block extracting unit divides the image shot by the image capturing device into a plurality of image blocks, preferably, into a a plurality of image blocks with the same size. More specifically, the image block extracting unit 310 performs edge cutting on the original image at first to remove parts with possibly inaccurate tones, and then performs size compression to convert into a standard image with the same resolution, then the standard image is subjected to mesh division to obtain a plurality of image blocks without repeated edges, and each image block has the same resolution.

The image block preprocessing unit 311 processes the image blocks to obtain a corresponding tone map and a corresponding grey-scale map.

if a color format of the image blocks is an RGB format or other non-HSV formats, then the color format of the image block is converted into an HSV format to extract tone information therefrom, the tone map corresponding to the image blocks is obtained, after processing, the size of the tone map and that of the image blocks are the same, and each pixel point thereon correspondingly has a tone value to represent the tone value of each pixel point of the image blocks.

In addition, the image block preprocessing unit 311 further performs graying on the image blocks to obtain the grey-scale information to generate a corresponding grey-scale map which represents the grey-scale value of each pixel point of the image blocks.

In addition, the tone feature extracting unit 312 extracts at least one specific tone feature value related to grassland features from the tone map.

Colors of grasses of the lawn are located in a certain tone interval generally, the tone feature extracting unit 312 extracts a specific tone feature value related to the grassland features based on such principle for the grassland recognizing unit 316 to screen out related image blocks, and lots of non-grassland images are deleted.

In one embodiment, the extracted specific tone feature value comprises a tone average value of respective pixel points of the image blocks, in another optional embodiment, the specific tone feature value is a ratio of pixel points with the tone values in a preset threshold interval to all pixel points, for example, the ratio of the pixel points with the tone values between 0-89 to all pixel points is larger than 80%. Of course, the specific tone feature value can also be other proper specific values related to the grassland features. In the two embodiments above, there is only one specific tone feature value, but in other embodiments, a quantity of the specific tone feature values extracted by the tone feature extracting unit 312 can be more, for example, the specific tone features are respectively a tone average value of respective pixels points of the image blocks and a ratio of the pixel points of which the tone values are in a preset interval to all pixel points.

The frequency domain feature extracting unit 313 performs frequency domain transformation on the grey-scale map to extract at least one specific frequency domain feature value related to the grassland features.

In the grassland, intervals among the grasses will generate a regular light and shade change, and such rule can be recognized by performing frequency domain transformation on the grey-scale map. The frequency domain feature extracting unit 313 extracts grassland-related features based on such principle, and allows the grassland recognizing unit 316 to screen and exclude the non-grassland image.

A manner of the frequency domain transformation is at least one of Fourier transformation and Gabor transformation. That is, the frequency domain feature extracting unit 313 can singly use Fourier transformation to obtain a frequency domain feature, or singly uses Gabor transformation to obtain the frequency domain feature, or uses Fourier transformation to obtain the frequency domain feature and uses Gabor transformation to obtain the frequency domain feature.

Specifically, at first, a corresponding array matrix is generated according to the grey-scale map, and then Fourier transformation is performed on the array matrix of the image. The transformation manner is mentioned as the method embodiment above and is not repeated any more.

After the Fourier transformation, the grey-scale map is converted into a frequency domain map of the same size, and each coordinate position in the frequency domain map has a phase value and an amplitude value. The whole frequency domain map correspondingly has a phase spectrum and an amplitude value spectrum. The size of each of the phase spectrum and the amplitude value spectrum is N*N, the phase spectrum and the amplitude value spectrum are both converted into a one-dimensional vector (1*N^2), then through Fourier transformation, 2*N^2 frequency domain feature values are extracted from the image blocks.

After the frequency domain feature values are obtained, at least one specific frequency domain feature value related to the grassland features is selected for the grassland recognizing module 316 to judge whether the image blocks are the grassland image. In the present embodiment, a phase value and an amplitude value of at least one coordinate location are extracted as a specific frequency domain feature value respectively for the image recognizing module to perform grassland judgment according to a corresponding preset threshold range. For example, whether the phase value of a specific coordinate point (x1, y1) is in an interval (a1, b1) and whether the amplitude value is larger than c1; and whether the phase value of a specific coordinate point (x2, y2) is in an interval (a2, b2) and whether the amplitude value is larger than c2. In such embodiment, the quantity of the specific coordinate points, respective coordinate locations, and a threshold range of respective phase values and amplitude values are selected according to common features of the grassland but are not unique, and there are many selection solutions and combination manners.

The method for obtaining the frequency domain features by adopting Gabor transformation is described below, the frequency domain features obtained by using the Gabor transformation are called as Gabor features, and the specific frequency domain feature value extracted therefrom is called as specific Gabor feature value.

Gabor transformation is a short-time Fourier transformation method, and is essentially that a window function is added to Fourier transformation, and time frequency analysis of a signal is realized by the window function. When a Gaussian function is selected as the window function, the short-time Fourier transformation is called as Gabor transformation. A Gabor filter group can better describe local structure information corresponding to a spatial frequency (dimension), spatial position and direction selectivity. Therefore, Gabor can be used to recognize information such as corresponding spatial position and direction of the grassland to judge the grassland.

FIG. 9 is a Gabor filter group used in the present embodiment. The filter group is generated by arrangement and combination of 4 frequencies and 8 filtering directions. In one embodiment, the image location of the Gabor filter group is the whole image, that is, a coordinate range of the template is same at that of processed image blocks. A generation equation of the Gabor filter is as mentioned in the method embodiment above, and is not repeated any more.

After the template is applied to the image blocks for operation, similar to Fourier transformation, a phase spectrum and amplitude value spectrum can still be obtained. Still similar to the Fourier transformation, each template will generate $2*N^2$ Gabor feature values.

After the $2*N^2$ Gabor feature values are extracted, whether all feature meet a preset condition does not need to be judged as long as some specific typical features are required to be selected as specific Gabor values, and whether the Gabor values are in a preset threshold interval are judged by the grassland recognizing module 316.

Similar to Fourier transformation, the Gabor feature extracting unit can select a plurality of Gabor feature values, and whether these Gabor feature values are in respective threshold ranges is judged. In the present embodiment, the phase value and amplitude value of at least one specific coordinate location are extracted as one specific Gabor feature value respectively for the grassland recognizing module 316 to judge. For example, whether the phase value of the specific coordinate points (x3, y3) is in an interval (a3, b3), and whether the amplitude value is larger than c3; and whether the phase value of the specific coordinate points (x4, y4) is in an interval (a4, b4), and whether the amplitude value is larger than c4. In the present embodiment, the quantity of the specific coordinate points, respective coordinate locations, and a threshold range of respective phase values and amplitude values are selected according to common features of the grassland but are not unique, and there are many selection solutions and combination manners.

The Haar-like feature extracting unit 314 applies a Haar-like template to the grey-scale map to extract at least one specific Haar-like feature value related to the grassland features.

The Haar-like feature value is suitable for recognizing an object having an obvious and stable structure as long as the structure is relatively fixed and can still be recognized even subjected to nonlinear deformation such as twisting.

As shown in FIGS. 10-13, the Haar-like features are divided into 4 types: edge features, linear features, central features and diagonal features, each type of features can generate one or more feature templates, white and black matrixes exist in the template, and the feature value of the template is defined as subtraction of a pixel sum of the black rectangle from a pixel sum of the while rectangle. One feature template can be placed in the image blocks in different forms for feature extraction, the size and location of the feature template in the image blocks are variable, and each determined size and location combination is called as one form. Then, under the specific form, grey-scale values of the pixels covered by the feature template in the image blocks are subjected to weighted summation, that is, if a corresponding point on the template is white, then a value of the point is the grey-scale value multiplied by 1, and if a corresponding point on the template is black, then a value of the point is the grey-scale value multiplied by −1. Different feature templates are placed in the image blocks with different sizes and locations, and then lots of Haar-like features are generated. However, when whether the image blocks are the grassland is judged, it is unnecessary to calculate and judge all features one by one, and in one embodiment, only a plurality of typical features need to be extracted as specific Haar-like feature values for the grassland recognizing module 316 to judge.

For example, in one embodiment, the edge feature template Haar_Y2 with a size of 6*6 is placed in the central location of the image, one feature value is obtained through the weighing and calculating mentioned above. In other optional embodiments, a plurality of Haar-like features can be generated by different templates and different placing forms.

The matrix statistical feature extracting unit 317 performs matrix transformation on the grey-scale map to extract at least one specific matrix statistical feature value related to the grassland features.

A manner of matrix transformation is at least one of matrix transformation is at least one of grey-scale co-occurrence matrix transformation and Hu invariant moment transformation. When the grey-scale co-occurrence matrix transformation is performed, the generated features are specifically called as grey-scale co-occurrence matrix features, and specific feature values extracted therefrom are specific grey-scale co-occurrence matrix feature values. When the Hu invariant moment transformation is performed, the generated features are specifically called as Hu invariant moment features, and specific feature values extracted therefrom are specific Hu invariant moment feature values.

A method for the grey-scale co-occurrence matrix transformation is to constitute any point (x, y) and a point (x+a, y+b) into a point pair, wherein a and b are random integer offsets. A grey-scale value of the point pair is (f1, f2), then the point (x, y) is moved on the whole image to obtain different (f1, f2) values. A maximal grey scale of the image is L (256 generally), then there are L*L kinds of combinations of f1 and f2. For the whole image, the occurring numbers of all (f1, f2) are counted, then a matrix (the size is L*L) is arrayed, then the total occurring number of (f1, f2) is normalized into an occurring probability P(f1, f2), and the matrix generated thereby is the grey-scale co-occurrence matrix. Each value in the matrix can serve as one grey-scale co-occurrence matrix feature. In this step, at least one grey-scale co-occurrence matrix feature value related to the grassland features is extracted therefrom.

The method of Hu invariant moment transformation is introduced below.

The Hu invariant moment feature extracting unit 318 generates Hu variant moments of the image blocks and extracts at least one of specific Hu variant moment feature value related to the grassland features;

the Hu invariant moment has characteristics of unchanged rotation, translation and dimension, has very good anti-interference property and a processing method is as mentioned by the method embodiment above and is not repeated any more.

After the Hu variant moments are generated, at least one of specific Hu variant moment feature value related to the grassland features is extracted from the Hu variant moment features.

The color channel feature extracting unit 319 converts a color space, having a plurality of color channels, of the image blocks to extract at least one specific color channel feature value related to the grassland features.

The color space comprises at least one of an HSV color space, a CMY color space, a Lab color space or a YIQ color space, and the specific color channel feature value is an average value of parameters values of respective pixels on specific color channels.

The HSV color space is taken as an example, values of pixels of the H channel are taken and are averaged to obtain one feature, and three feature values can be generated together with the average values of the S channel and the V channel. Other respective formats can also generate plurality of similar color channel features. This step extracts at least one specific color channel feature value related to the grassland features from these features.

The local feature operator extracting unit extracts at least one specific local feature value related to the grassland features of the image blocks through a local feature operator.

The local feature operator at least comprises: an LBP operator (Local Binary Pattern), a WLD operator (Weber Local Operator) and an SIFT operator (Scale Invariant Feature Transformation).

In the present embodiment, the grassland recognizing unit 316 firstly judges whether one or more specific tone feature values are in a corresponding preset threshold interval at first. In the preset embodiment, one specific tone feature value is an average value of the tone values of respective pixel points, and a preset threshold interval corresponding to the average value is 0-89. If any specific tone feature value is not in the preset threshold interval, then the image blocks are judged to be the non-grassland image; and if all specific tone feature values are in the corresponding preset threshold intervals, then whether other specific feature values are in the correspondingly preset threshold intervals is continuously judged.

If the judged results of all specific tone feature values are yes, then the grassland recognizing unit 316 judges whether one or more specific frequency domain feature values are in the correspondingly disposed preset threshold intervals. The specific frequency domain feature value can be generated by Fourier transformation or Gabor transformation, and can be generated by both of them. In the present embodiment, whether a phase value of the specific coordinate point (x1, y1) in the phase spectrum is in an interval (a1, b1) is judged at first, if the judged result is no, then the image blocks are recognized to be the non-grassland image, and if the judged result is yes, then whether an amplitude value of the specific coordinate point (x1, y1) mentioned above is in a preset threshold interval is continuously judged, specifically, whether the amplitude value is larger than c1 is judged. Similarly, if any specific frequency domain feature value is not in the preset threshold interval, then the image blocks are judged to be the non-grassland image; and if all specific frequency domain feature values are in the preset threshold intervals, then whether other specific feature values are in the corresponding preset threshold intervals is continuously judged.

If the judged results of all specific frequency domain feature values are all yes, then the grassland recognizing unit 316 continuously judges whether one or more Haar-like feature values are in the preset threshold interval. If any specific Haar-like feature value is not in the preset threshold interval, then the image blocks are judged to be the non-grassland image; and if all specific Haar-like feature values are in the corresponding preset threshold intervals, whether other specific feature values are in the corresponding preset threshold intervals is continuously judged.

If the judged results of all specific Haar-like feature values are all yes, then the grassland recognizing unit 316 continuously judges whether one or more specific matrix statistical feature values are in the preset threshold interval. The specific matrix statistical feature values can be specific grey-scale co-occurrence matrix feature values or specific Hu variant moment feature values, and can also be both of them. If the judged result of any specific matrix statistical feature value is no, then the image blocks are judged to be the non-grassland image; and if the judged results of all specific matrix statistical feature values are yes, whether other specific feature values are in the corresponding preset threshold intervals is continuously judged.

If the judged results of all specific matrix statistical feature values are all yes, then the grassland recognizing unit 316 continuously judges whether one or more specific color space channel feature values are in the preset threshold interval. If the judged result of any specific color space channel feature value is no, then the image blocks are judged to be the non-grassland image; and if the judged results of all specific color space channel feature values are yes, whether other specific feature values are in the corresponding preset threshold intervals is continuously judged.

If the judged results of all specific color space channel feature values are all yes, then whether one or more local feature values are in the preset threshold intervals is continuously judged. If the judged result of any local feature value is no, then the image blocks are judged to be the non-grassland image; and if the judged results of all specific color space channel feature values are yes, it is indicated that all specific feature values are judged completely and are in the respectively corresponding preset threshold intervals, at this point, the image block is recognized to be the grassland image.

It should be noted that in the present embodiment, a judging sequence of respective specific feature values is only exemplary, and can be changed in many forms, and this judging sequence does not affect implementation of the present invention. For example, after whether respective specific color channel feature values are in the correspondingly disposed preset threshold intervals is judged, the condition of each specific Haar-like feature value is judged, and then the condition of each specific frequency domain feature value and the condition of each tone feature value are judged in sequence; or sequencing may not be performed according to categories of the specific features values, for example, the condition of one Haar-like feature value is judged at first, then the condition of one specific tone feature value is judged, and then the condition of one Haar-like feature value is judged, and so on, which is not repeated any more.

In addition, for the purpose of convenient description, the tone feature extracting unit 312, the frequency domain feature extracting unit 313, the Haar-like feature extracting unit 314, the grassland recognizing unit 316 and the like are introduced in sequence, and an introduced sequence does not represent a specific executing sequence. The Haar-like feature extracting unit 314 can work before the tone feature extracting unit 312, and specific work of each feature extracting unit and the specific action in the grassland recognizing unit 316 can be executed in a crossing manner. For example, right after the tone feature extracting unit 312 extracts the specific tone feature value, the grassland recognizing unit 316 is enabled to judge whether the extracted tone feature value is in the preset threshold interval, otherwise, the image blocks are judged to be non-grassland image, and if yes, certain feature extracting unit is enabled to continuously extract the specific feature value. A specific change form can be easily conceived by those skilled in the art and is not repeated any more.

In order to recognize the grassland as accurate as possible, the grassland-related specific feature values extracted in the embodiments mentioned above are more than 10. Of course, in some embodiments, if the specific feature values are properly selected, its quantity can also be smaller than 10.

Another optional embodiment of the lawn maintenance robot is introduced below, this embodiment is basically same as the last embodiment, and a difference is that the robot only has at least one of the Haar-like feature extracting unit 314, the matrix statistical feature extracting unit 317 and the color channel feature extracting unit 319. Correspondingly, at least one of the Harr-like feature value, the specific matrix statistical feature value, the specific color channel feature value and the specific local feature value can be extracted, and the grassland recognizing unit recognizes whether the image blocks are the grassland image by only judging whether the correspondingly obtained specific feature value is in the preset threshold interval. The specific feature value is the specific tone feature value and the specific frequency domain feature value, and also comprises at least one of the Haar-like feature value, the specific matrix statistical feature value, the specific color channel feature value and the specific local feature value.

Another optional embodiment of the lawn maintenance robot is introduced below, this embodiment is basically same as the last embodiment, and a difference is that the robot only has at least two of the Haar-like feature extracting unit 314, the matrix statistical feature extracting unit 317 and the color channel feature extracting unit 319. Correspondingly, at least two of the Harr-like feature value, the specific matrix statistical feature value, the specific color channel feature value and the specific local feature value can be extracted, and the grassland recognizing unit recognizes whether the image blocks are the grassland image by only judging whether the correspondingly obtained specific feature value is in the preset threshold interval. The specific feature value is the specific tone feature value and the specific frequency domain feature value, and also comprises at least two of the Haar-like feature value, the specific matrix statistical feature value, the specific color channel feature value and the specific local feature value.

According to the manner above, the main control module 31 judges whether the respective divided image blocks are the grassland image one by one, after the judgment is finished and judged results are summarized, the main control module 31 can judge a grassland distribution condition in the target area, the locations corresponding to which image blocks are the grassland 5, the locations corresponding to which image blocks are the non-grassland, and on such basis, the border line between the grassland 5 and the non-grassland is judged to be a border 6. On the basis that the grassland 5, the border 6 and the non-grassland are recognized, the main control module 31 can control the lawn maintenance robot to keep walking on the grassland 5 without crossing the border, or to perform other specific actions, for example, to walk along the border 6 to be retuned to the dock 4. There are many possible actions which are repeated herein.

An automatic working system of another embodiment of the present invention is introduced below.

Figure 17:
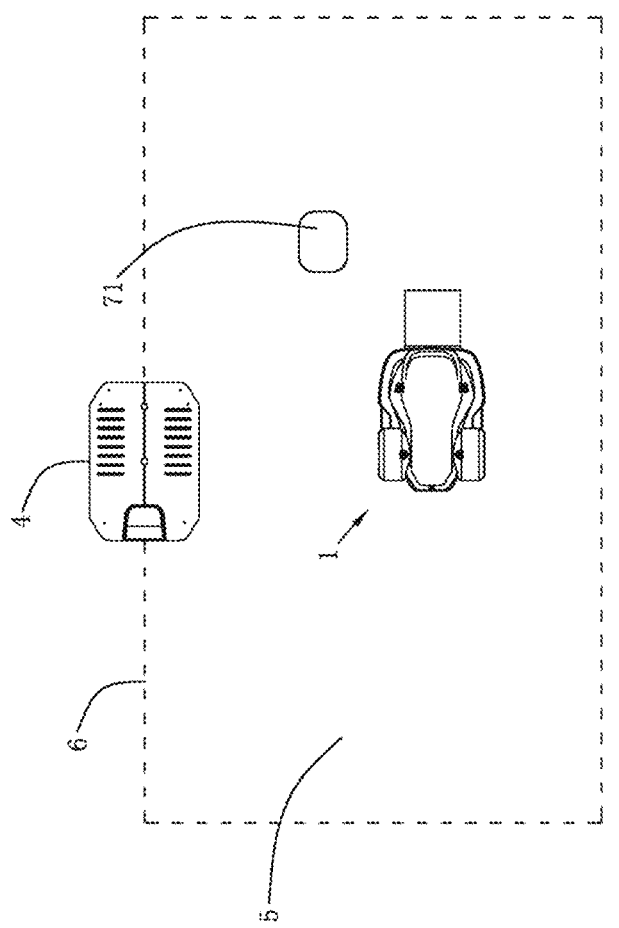
FIG. 17 is a diagram of an automatic working system of one embodiment of the present invention.

As shown in FIG. 17, the automatic working system is disposed on the ground or other surfaces. In the present embodiment, the ground is divided into a working area 5 and a nonworking area, part of the nonworking area surrounded by the working area 5 forms an island 71, and the border line between the working area 5 and the non-working area forms a border 6. The working area 5 and the nonworking area have a difference visually.

The automatic working system comprises a self-moving robot 1 and a dock 4. The automatic-moving robot 1 can be an automatic dust collector, an automatic mower, an automatic trimmer, etc. In the present embodiment, the self-moving robot 1 is an automatic mower, and the dock 4 is disposed on the peripheral border 6 of the working area.

Figure 18:
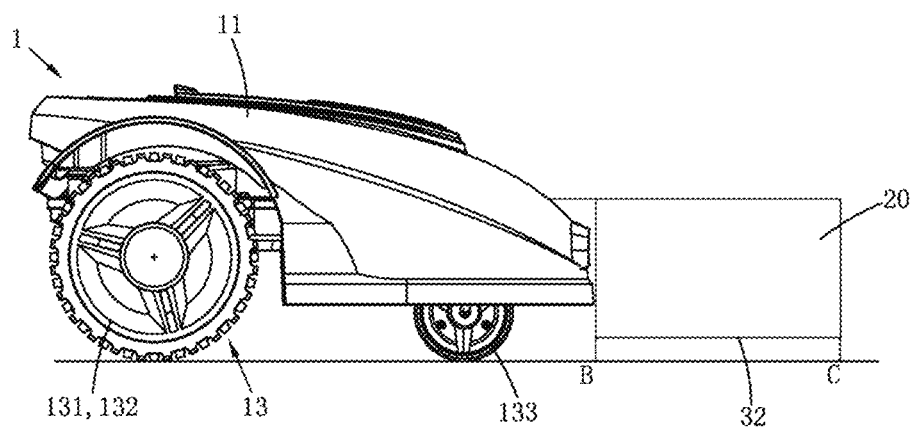
FIG. 18 is a space diagram of an automatic walking device of the automatic working system as shown in FIG. 17.
Figure 19:
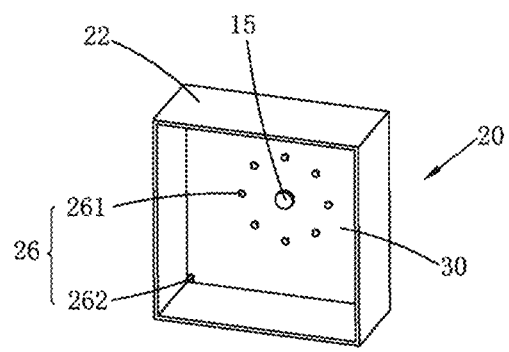
FIG. 19 is a space diagram of a shading cover of the automatic walking device as shown in FIG. 18.
Figure 20:
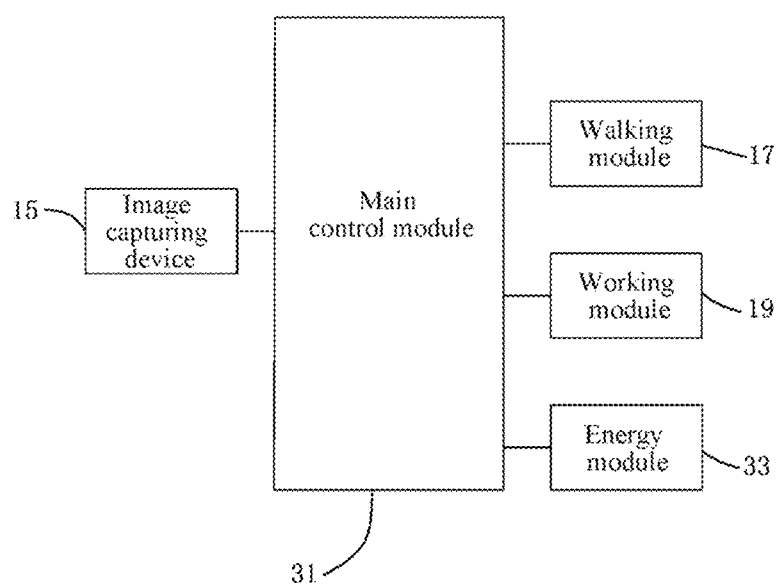
FIG. 20 is a module diagram of the automatic walking device as shown in FIG. 18.

In combination with FIGS. 18-20, the self-moving robot 1 has a shell 11 and a shading cover 20 mounted on the shell 11, the shading cover 20 comprises a shield body 22, which has an opening 32 facing the ground, and a light source 26 and an image capturing device 15 are disposed in the cover body 22. The image capturing device 15 shoots an image of the target area in front of the self-moving robot.

The self-moving robot 1 also comprises a main control module 31, a driving module 17 and an energy module 33. The main control module 31 is connected to the driving module 17, the working module 19, the energy module 33 and the image capturing module 15.

The working module 19 is configured to execute specific work. In the present embodiment, the working module 19 is a cutting module specifically and comprises a cutting component (not shown) and a cutting motor (not shown) for driving the cutting component.

The energy module 33 is configured to provide energy for operation of the lawn maintenance robot. Energy of the energy module 33 can be gasoline, a battery pack and the like, and the energy module 33 in the present embodiment comprises a chargeable battery pack disposed in the shell 2. When in work, electric energy released by the battery pack can keep the self-moving robot 1 to work. When not in work, the battery can be connected to an external power source to compensate the electric energy. Particularly, in view of a more humanized design, when the electric quantity of the battery is detected to be insufficient, the self-moving robot 1 will automatically seek for the dock 4 for compensating the electric energy.

The driving module 17 comprises a wheel set 13 and a walking motor driving the wheel set 13. There are many disposing methods for the wheel set 13. The wheel set 13 usually comprises a driving wheel driven by a walking motor and an auxiliary wheel 133 supporting the shell 11 in an auxiliary manner, and a quantity of the driving wheel can be 1, 2 or more. As shown in FIG. 19, a moving direction of the self-moving robot 1 is taken as a front side, one side opposite to the front side is a rear side, and two sides adjacent to the rear side are left and right sides respectively. In the present embodiment, there are 2 driving wheels of the self-moving robot 1, which are respectively a left wheel 131 on the left and a right wheel 132 on the right. The left wheel 131 and the right wheel 132 are symmetrically disposed about a middle axis of the self-moving robot 1. The left wheel 131 and the right wheel 132 are preferably located on the rear part of the shell 11, the auxiliary wheel 133 is located on the front part, and of course, the left and right wheels and auxiliary wheels can be disposed in an exchanging manner in other embodiments.

In the present embodiment, one driving motor is matched with each of the left wheel 131 and the right wheel 132 so as to realize differential output to control steering. The driving motor can be directly connected to the driving wheel, but a transmission device for example, a common planetary wheel system in the technical field, can be disposed between the driving motor and the driving wheel. In other embodiments, two driving wheels and one driving motor can also be disposed, and in such a case, the driving motor drives the left wheel 131 by a first transmission device, and drives the right wheel 132 by a second transmission device. That is, one motor drives the left wheel 131 and the right wheel 132 through different transmission devices.

Figure 21:
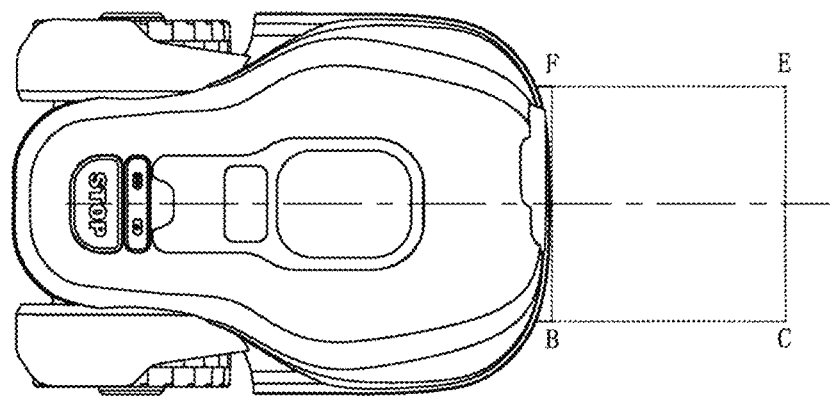
FIG. 21 is a schematic diagram of a shooting area of the automatic walking device as shown in FIG. 18.

In combination with FIGS. 18, 19 and 21, the shading cover 20 is mounted in front of the shell 11, and preferably in the middle of the shell. The shading cover 20 comprises a cover body 22, and configured to stop outside light from entering the cover body 22. The cover body 22 has a top 30 and an opening 32 facing the ground, there is no special limitation to the shape of the cover body 22 of the shading cover 20 as long as the light is stopped from entering the cover body 22, exemplarily, the shape of the cover body can be a cuboid or circular cone table. Specifically, in the present embodiment, the shape of the cover body 22 is a cuboid.

The image capturing device 15 is disposed in the cover body 22, preferably, the image capturing device 15 is disposed in a central position of the top 30 of the cover body 22 and captures an image of an area in front of the shell 11, and the front area at least comprises a target area of the front ground. Specifically, the front area is an area where the opening 32 is projected on the ground. In the present embodiment, a framing area of the image capturing device 15 is a fixed area, and a visual angle range of the image capturing device 15 is from 50 degrees to 135 degrees.

Preferably, the target area is an area where the opening 32 is protected on the ground, that is, a BCEF area as shown in FIG. 21, preferably, the target area is located right ahead of the shell 11. Due to such arrangement, an image captured by the image capturing device 15 can truly and timely reflect a condition of the area in front of the self-moving robot 1, so that whether the front area is a working area or nonworking area can be conveniently judged.

Preferably, in order to better capture an image of the target area on the ground, a distance range from the image capturing device 15 to the ground is 0.1-1 m. Specifically in the present embodiment, the image capturing device 15 is a camera, the camera faces the ground and is perpendicularly disposed on the top 30 of the cover body 22 of the shading cover 20, and a height to the ground is 25 cm.

The shading cover 20 stops the outside light from entering the cover body 22, so as to avoid an interference on a quality of the image captured by the image capturing device 15, for example, the image capturing device 15 is overexposed due to superstrong sunlight in the daytime, and the image capturing device 15 cannot capture an image corresponding to an actual ground condition in a case of insufficient light on rainy days or at night. Therefore, the light source 26 is disposed in the cover body 22 and provides stable light for the image capturing device 15, such that the image capturing device 15 will not be affected by external light or environment, and the captured image of the target area can truly reflect a working condition of the ground.

Preferably, a height from the image capturing device 15 to the ground is smaller than that of the light source 26 to the ground, due to such arrangement, the light emitted from the light source 26 is prevented from perpendicularly irradiating the image capturing device 15, so as to ensure the quality of the image captured by the image capturing device 15.

Specifically, a color temperature range of the light emitted by the light source 26 is 4500-9000K, preferably, a color temperature range of the light emitted by the light source 26 is 5000-7500K, that is, the light emitted by the light source 26 is white.

Preferably, the light source 26 is selected from an LED lamp or a fluorescent lamp.

Preferably, the light source 26 comprises main light sources 261, mounted in a middle area of the top 30 of the cover body 22, and specifically, two or more main light sources 261 are disposed and are symmetrically disposed around the image capturing device 15. In the present embodiment, the image capturing device 15 is mounted in a central position of the top 30, and there are 8 light sources which are symmetrically and circumferentially disposed around the image capturing device 15.

Figure 22:
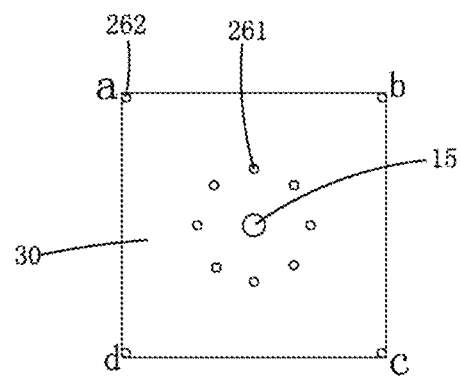
FIG. 22 is a schematic diagram that the top of a shading cover is a quadrangle of one embodiment of the present invention.
Figure 23:
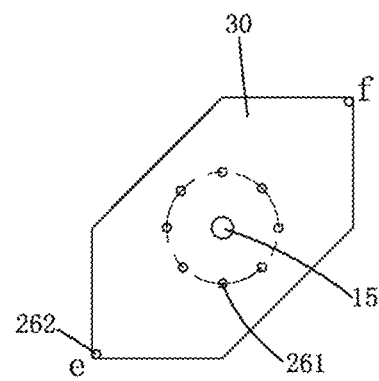
FIG. 23 is a schematic diagram that the top of a shading cover is a hexagon of one embodiment of the present invention.
Figure 24:
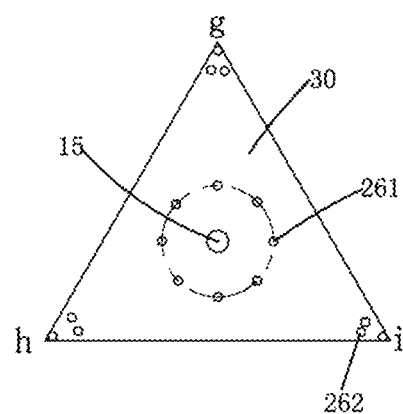
FIG. 24 is a schematic diagram that the top of a shading cover is a triangle of one embodiment of the present invention.

FIGS. 22-24 illustrate the top 20 of the cover body 22 having a plurality of shapes, and the shape of the top 30 is a polygon. In order to enable the light in the cover body 22 to be sufficient and uniform, more preferably, the light source 26 also comprises a light compensating source 262 disposed in an area, close to the edge, of the top 30 of the cover body 22. Specifically, the top 30 having a polygon correspondingly has a plurality of angles, on at least one of which the light compensating source 262 is disposed.

In the present embodiment, the mounting position "one angle" of the light compensating source 262 can be understood in a relatively wide manner, and is not merely limited to a point of intersection formed by any two adjacent sides of the polygon, the mounting position of the light compensating source 262 should be understood to be at least one corner of the polygon of the top 30, and the corner comprises a point of intersection position formed by any two adjacent sides of the polygon and a position close to the point of intersection.

Specifically, in the FIG. 22, the top 30 of the cover body 22 is a quadrangle, the image capturing device 15 is disposed in the central position of the top 30, and 8 light sources are symmetrically distributed around the image capturing device 15. In order to ensure that the light in each potion in the cover body 22 is sufficient without a dark region, the light compensating sources 262 are respectively mounted on four angles (a, b, c and d) of the quadrangle of the top 30.

Specifically, in FIG. 23, the top 30 of the cover body 22 is a hexagon, similarly, in order to ensure that the light in each potion in the cover body 22 is sufficient without a dark region, the light compensating sources 262 are respectively mounted on angles (e and f), farther away from the image capturing device 15, of the hexagon of the top 30.

Specifically, in FIG. 24, the top 30 of the cover body 22 is a triangle, similarly, in order to ensure that the light in each potion in the cover body 22 is sufficient without a dark region, except for three angles (g, h and i) of the triangle of the top 30, the positions close to the three angles of the triangle of the top 30 are also provided with two light compensating sources 262 respectively.

Preferably, the cover body 22 has an inner wall, and the inner wall is provided with a diffuse reflection layer (not shown). Thus, it is ensured that the light reflected into the image capturing device 1 from the ground is more uniform, such that the image captured by the image capturing device 15 is more real, and is close to an image observed by naked eyes. There is no special limitation to a material of the diffuse reflection layer as long as a condition that the light reflected to the inner wall of the cover body 22 from the ground is subjected to diffuse reflection is met, and specifically, the diffuse reflection layer can be a layer of white paper or white cloth attached to the inner wall 22.

Preferably, the shading cover 20 further comprises a flexible part (not shown) surrounding the cover body 22, and the flexible part extends to the ground and makes a contact with the ground. The flexible part can be configured to totally isolate external light from enter the cover body 22, so as to avoid an interference on the image capturing device 15, and meanwhile, it can be ensured that the self-moving robot 1 can smoothly walk when walking on the ground and meeting an obstacle such as rocks. Specifically, the material of the flexible part can be rubber, cloth or nylon.

The main control module 31 can judge attributes of each part in the framing area by analyzing various pieces of information in the image shot by the image capturing device 15, for example, analyzing whether each part belongs to the working area or the nonworking area or analyzing that each part belongs to a worked area or an area to be worked. Specifically, in the present embodiment, the main control module 31 judges whether the position corresponding to each part is the grassland as the working area by analyzing color information and texture information of each part in the image. As the working area, a color of the grassland is green, and textures are a natural irregular pattern, and as the nonworking area, the color of other grounds such as a land surface or concrete is not green generally, even the color is green, the other grounds are usually artificially processed objects, and have regular textures. Therefore, when recognizing that certain part is green and has irregular colors, the main control module 31 judges that the part is the grassland, and if the certain part is not green or has regular textures, it is judged to be non-grassland.

After attributes of each part are obtained though judging, the main control module 31 also controls a walking direction of the self-moving robot 1, such that the self-moving robot 1 is always in the working area.

According to the self-moving robot 1 provided by the present invention, an image in front of the self-moving robot 1 is captured by the image capturing device 15 in the cover body 22 of the shading cover 20, the cover body 22 excludes an influence of external light on the image capturing device, the light source 26 disposed in the cover body 22 provides stable and sufficient light for the image capturing device 15, such that the image captured by the image capturing device 15 can reflect a working condition of the target area more clearly and actually, the main control module 31 judges whether at least part of the target area is the working area in combination with color recognition and texture analysis, such that the working system is simple and humanized in arrangement, and recognition on the working area is accurate and convenient.

Those skilled in the art can conceive that the structure of the shading cover of the present invention can have other transformations, a specific structure of the self-moving robot can have many transformations, but main technical features of the adopted technical solution are same as or similar to the present invention, and all fall within a protective scope of the present invention.

An automatic working system of another embodiment of the present invention is introduced below.

In a working process of a mower, a camera can be mounted to collect some image information, and the grassland and non-grassland can be recognized according to these images to form a walking path. However, a traditional mower is provided with a wide angle camera for shooting, such shooting range is limited, and image distortion is large, as a result, a condition of misjudgment very easily occurs.

Figure 25:
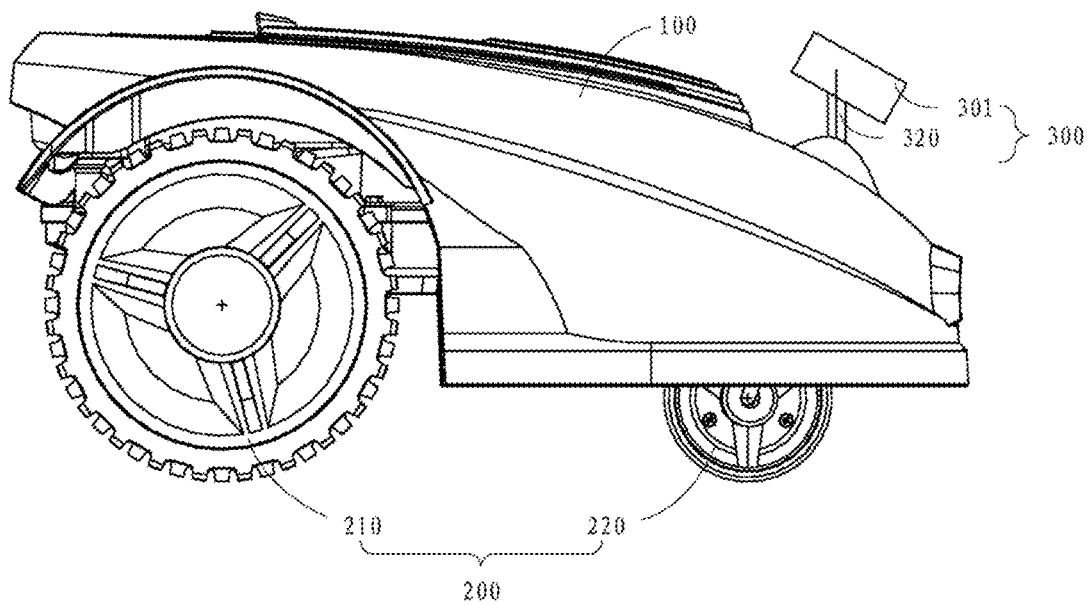
FIG. 25 is a schematic diagram of an external structure of an automatic walking device in one embodiment of the present invention.
Figure 26:
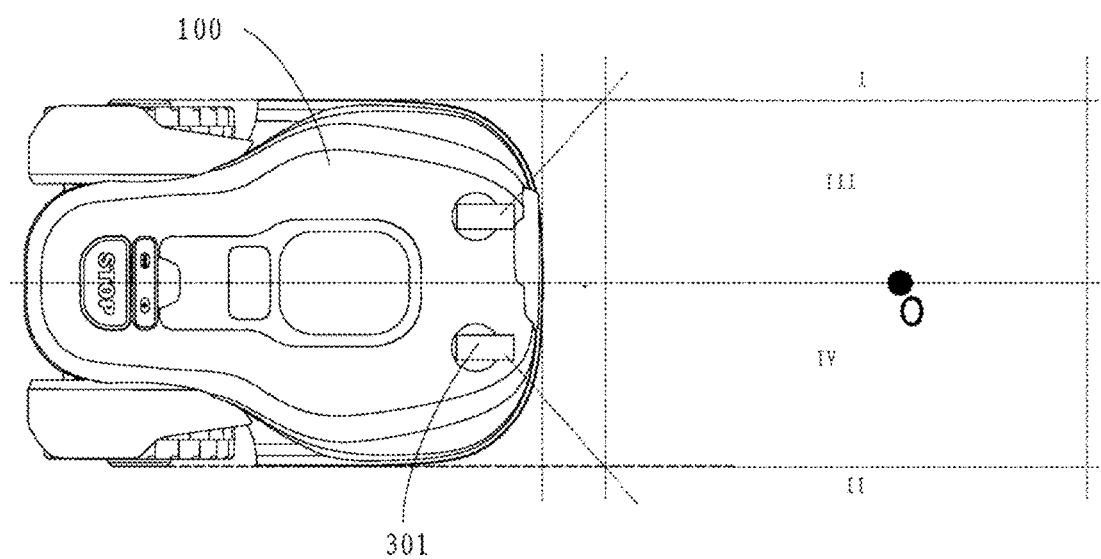
FIG. 26 is a schematic diagram of a vision field range of an automatic walking device in one embodiment of the present invention.
Figure 27:
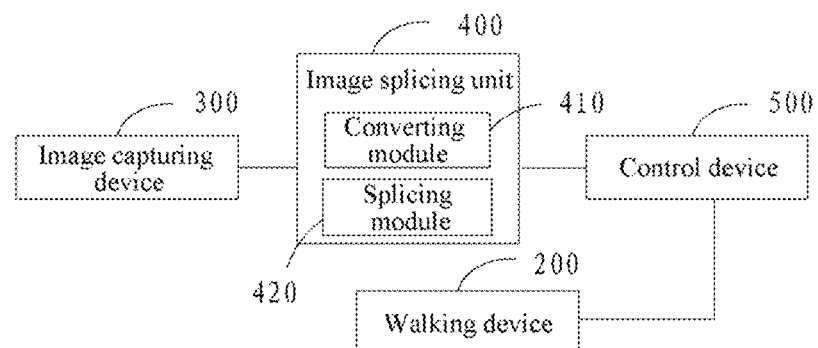
FIG. 27 is a structural module diagram of an automatic walking device in one embodiment of the present invention.

Reference is made to FIGS. 25-27, which are a schematic diagram of an external structure or a schematic diagram of a vision field range of a self-moving robot, or called as an automatic walking device in one embodiment respectively. In the present embodiment, the mower is mainly taken as the automatic walking device for explanation, and it can be understood that in other embodiments, other automatic walking devices, such as an automatic dust collector, a robot, etc., can be adopted.

The automatic walking device comprises a machine body 100, a walking device 200, an image capturing device 300, an image splicing circuit 400 and a control device 400, wherein the walking device 200 and the image capturing device 300 are mounted on the machine body 100, and the image splicing circuit 400 and the control device 500 are in the machine body 100.

The mower needs to judge an external environment (particularly some border areas) in a working process, recognizes the grassland area and the non-grassland area to timely adjust a walking direction, and thus avoids a wrong mowing phenomenon. A shooting range of one camera is very limited, but if the visible range is enlarged, that is, a wide angle camera is adopted, then an effective visible distance of the camera will be correspondingly reduced, an image shot in this way is distorted, and misjudgment is caused. In the present embodiment, the image capturing device 300 comprises two cameras 301, configured to collect image information of the external environment, and thus the wide angle camera is not required.

The visual angle and mounting direction of the cameras 301 decide the size of a visible area. In the present embodiment, the two cameras 301 are respectively located at two sides which are in front of the machine body and symmetric relative to the machine body. When the image is recognized and whether the image area is the grassland area is judged, the visible area of the cameras 301 needs to be processed.

In the present embodiment, the image capturing device 300 also comprises a movable connector 320, through which the two cameras 301 are connected to the machine body 100, and the movable connector 320 is configured to adjust collecting angles of the two cameras 301.

The image splicing circuit 400 is configured to overlap and clip image information collected by the two cameras 301 to form spliced image information. Specifically, the image splicing circuit 400 comprises a converting module 410 and a splicing module 420.

The converting module 410 is configured to respectively convert the image information collected by the two cameras 310 into first image data and second image data respectively. The splicing module 420 is configured to overlap the first image data and the second image data through logic operation and clip signals in the first image data overlapped with those in the second image data or clip image data in the second image data overlapped with those in the first image data. The spliced image is a seamless overall image spliced by the two cameras 301.

It can be understood that in other embodiments, the image capturing device 300 can comprise a plurality of cameras, and the image splicing circuit 400 is configured to overlap and clip the image information collected by the plurality of cameras to form spliced image information. Specifically, the image information collected by the plurality of cameras are converted into different image data respectively; and the different image data are overlapped through logic operation, and the overlapped image data are clipped to form the spliced image information.

The image control device 500 is configured to control a walking direction of the walking device 200 according to the spliced image information. The walking device comprises a driving wheel 210 and a driven wheel 220, the control device 500 controls a walking direction of the driving wheel 210 according to the spliced image information and the driving wheel 210 drives the driven wheel 220 to walk.

Specifically, the control device will extract image features of the spliced image information at first, the image features generally comprise color features and texture features, then a similarity between the image features of the spliced image information and prestored standard image features is calculated, a grassland area and a non-grassland in the external environment are recognized according to the similarity, and finally a walking direction of the walking device 200 is controlled according to a recognized result.

As shown in FIG. 26, in a walking process of the automatic walking device, if the I area is recognized to be the non-grassland area, the III area is recognized to be the grassland area and the position in front of a border between the I area and the III area is the non-grassland area, then rightward deflection is performed; if the II area is recognized to be the non-grassland area, the IV area is recognized to be the grassland area and the position in front of a border between the II area and the IV area is the non-grassland area, then leftward deflection is performed; and if the front position is recognized to be the grassland area, then advancing along a straight line is performed.

Figure 28:
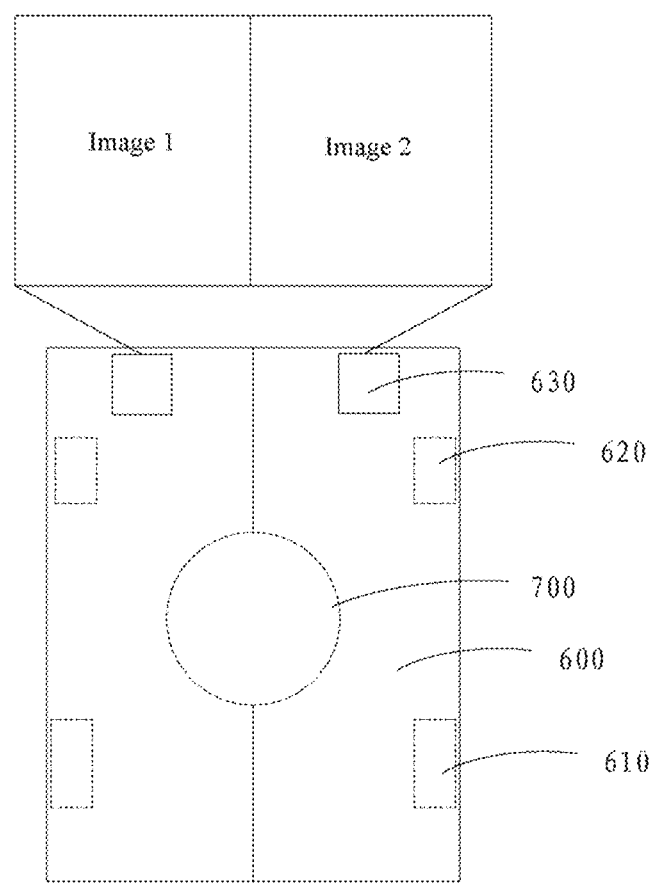
FIG. 28 is a structural schematic diagram of an automatic walking device of another embodiment of the present invention.

Reference is made to FIG. 28 which is a structural schematic diagram of an automatic walking device of another embodiment.

The automatic walking device comprises a machine body 600, a driving wheel 610, a driven wheel 620, a camera 630, an image splicing circuit (not shown), a control device (not shown) and a cutting device 700. The driving wheel 610, the driven wheel 620 and the camera 630 are mounted on the machine body 100, and the image splicing circuit, the control device and the cutting device 700 are located in the machine body 600.

In other embodiments, the control device is further configured to control the automatic walking device return to a charging station for charging timely, thus, enough power source is available when in need of work, use reliability is improved, and it is convenient to manage the automatic walking device.

In other embodiments, the control device is further configured to control a working state of the cutting device 700. Specifically, when working in the grassland area, the automatic walking device controls the cutting device 700 to work, and the cutting device 700 is controlled to stop working in a process that the automatic walking device is returned to the charging station.

In addition, there is also provided an automatic walking device, comprising a machine body and a walking device mounted on the machine body, and further comprising an image capturing device disposed on the machine body; the image capturing device comprises more than two cameras, configured to collect image information of an external environment; and a control device configured to respectively analyze image information collected by the more than two cameras and fuse analyzed results to control a walking direction of the walking device.

Specifically, the control device respectively analyzes the image information collected by the more than two cameras (that is, there is no need of splicing to form the spliced image information), and fuses the analyzed results. "Fuse" herein means that the analyzed results formed by respectively analyzing different image information can be used to control the walking direction of the walking device together.

According to the automatic walking device, the image information of the external environment can be collected by mounting more than two cameras, then the image information collected by the more than two cameras are overlapped and clipped by the image splicing circuit to form spliced image information, i.e., a large-range overall image, or the image information collected by the more than two cameras are respectively analyzed by the control device, and the analyzed results are fused to control the walking direction of the walking device, such that a sampling wide angle camera is not required, no image distortion does not occur and a misjudgment rate is low.

An automatic working system of another embodiment of the present invention is introduced below.

A self-moving robot, similar to an intelligent mower in a working process, is provided with a camera for collecting some image information and can judge whether front vegetation is cut and trimmed according to the image information. However, when the vegetation generates aberration when subjected to environmental influences (such as lighting, reflection, etc.), the image information collected by the camera will be deviated from original true colors, and a misjudgment phenomenon occurs to the mower.

Figure 29:
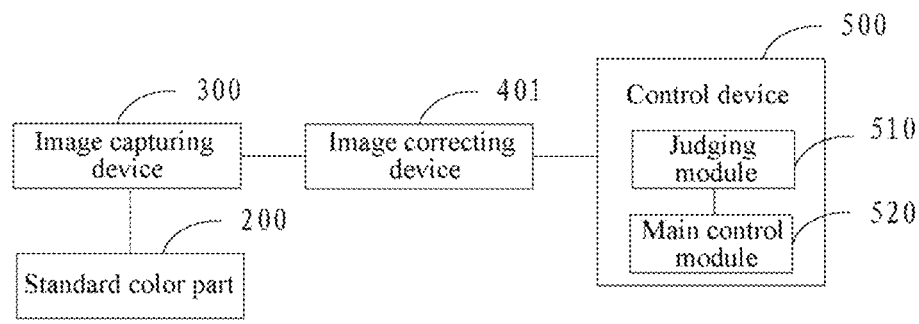
FIG. 29 is a structural module diagram of an intelligent mower in one embodiment of the present invention.
Figure 30:
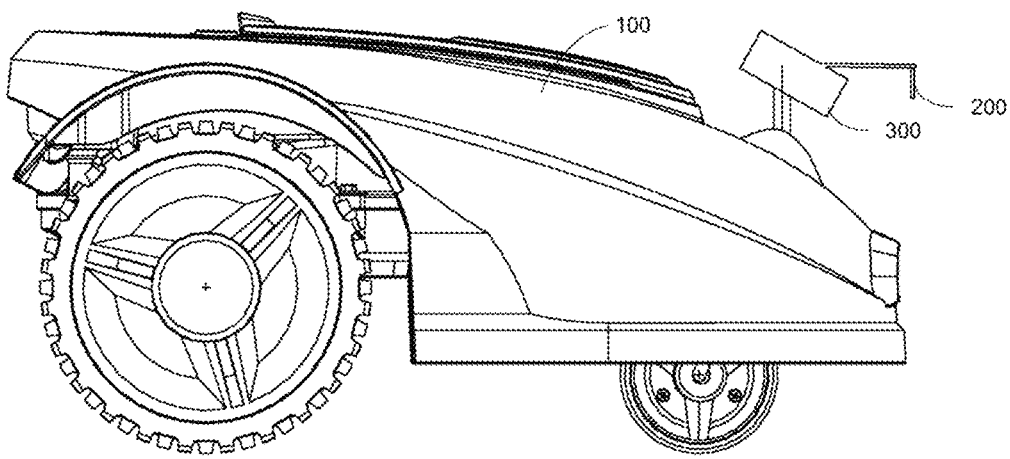
FIG. 30 is a schematic diagram of an external structure of the intelligent mower in FIG. 29.

Reference is made to FIGS. 29 and 30, which are a structural module diagram and an external result schematic diagram of an intelligent mower in one embodiment respectively.

The intelligent mower comprises a machine body 100, a standard color part 200, an image capturing device 300, an image correcting device 401 and a control device 500. The color standard part 200 is located in a shooting area of the image capturing device 300, and the image correcting device 401 is connected to the control device 500.

The intelligent mower needs to recognize an object in an external environment in a working process to avoid a wrong cutting phenomenon when the object in the external environment is not the target vegetation. In the present embodiment, the standard color part 200 is disposed in a vision field of the image capturing device 300, which is mounted on the machine body 100 and configured to collect image information of the external environment.

The object in the external environment will generate aberration when influenced by factors such as lighting, reflection and diffusion, and the like, then colors imaged through the standard color part 200 will be deviated from original colors to generate a deviated value, while this deviated value embodies the color deviation of the whole external environment.

In the present embodiment, the standard color part 200 is a standard palette 200 with trisected colors of white or red, green and blue. The standard palette 200 is located in a position, close to the upper part, in the center of a shooting vision field of the image capturing device 300, as shown in FIG. 30. It can be understood that in other embodiments, the standard color part 200 can also be located in a central position of the shooting area of the image capturing device 300.

The image correcting device 401 is configured to compare image information of the standard color part 200 obtained by the image capturing device 300 with stored standard color data, a color deviated value generated when the image capturing device 300 collects the image information of the external environment is obtained, and color correction is performed on the image information of the external environment according to the color deviated value. Specifically, for example, a gain of an RGB channel of the image information is adjusted, such that colors of the image information are restored.

The control device 500 is configured to control a working state of the intelligent mower according to the image information of the external environment subjected to color correction: when the object in the external environment is target vegetation, the intelligent mower is controlled to be kept in the original direction to continuously work; and when the object in the external environment is not target vegetation, the intelligent mower is controlled to stop working or be subjected to direction adjustment to continuously work.

When the object in the external environment is not target vegetation, there are two kinds of possibilities: one possibility is that when an obstacle such as bush or rocks around the lawn exists in front of the intelligent mower, but the mower still does not finish the mowing work of a whole lawn; the other possibility is that the intelligent mower has reached a corner of the lawn and has finished the mowing work of the whole lawn. In this way, if it is the former possibility, the intelligent mower is controlled to be subjected to direction adjustment to continuously work; and if it is the latter possibility, the intelligent mower is controlled to stop working. Judgment on these two kinds of possibilities is related to working time of the intelligent mower in specific embodiments to some degree.

Specifically, the control device 500 comprises a judging module 510 and a main control module 520. The judging module 510 is configured to judge whether the object in the external environment is the target vegetation according to image information. The main control module 520 is configured to control the working state of the intelligent mower according to the judged result of the judging module.

Color restoration of the image information is very important. For example, grass of the lawn is target vegetation originally, but due to irradiation of sunlight, colors of the grass in some positions will be deviated from the original colors, thus, a judged result of the judging module 510 is very easily affected, the grass in these positions are possibly misjudged to be not target vegetation, and are not mowed by omission. Similarly, if there is no road paved by rocks in the lawn, colors of the rocks are every close to that of the grass due to a refection action of the peripheral vegetation, and if color restoration is not performed, these rocks may be recognized as the target vegetation.

Figure 31:
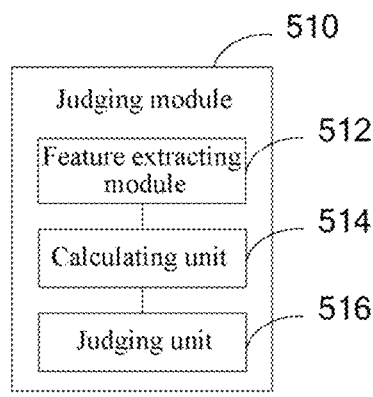
FIG. 31 is a frame diagram of a judging module in FIG. 30.

Reference is made to FIG. 31.

In the present embodiment, the judging module 510 comprises a feature extracting unit 512, a calculating unit 514 and a judging unit 516.

The feature extracting unit 512 is configured to extract image features of the image information, and the image features usually comprise color features and texture features. The calculating unit 514 is connected to the feature extracting unit 512, and configured to calculate similarity between the image features of the image information and standard image features. When the similarity is calculated, common distances comprise mahalanobis distance and Euclidean distance. The judging unit 516 is connected to the calculating unit 514, and configured to judge whether the similarity is larger than or equal to a similarity threshold, if yes, the object in the external environment is target vegetation; and if not, the object in the external environment is not target vegetation.

In other embodiments, the intelligent mower can also comprise an alarm device connected to the control device 500, which sends alarm information when the control device 500 controls the intelligent mower to stop working or be subjected to direction adjustment to continuously work. In this way, workers can know timely, and use reliability is improved. The alarm device can give out the alarm information, light alarm information, or sound-light alarm information, which can be intuitively known by the workers.

It can be appreciated that in other embodiments, after the control device 500 controls the intelligent mower to stop working, the intelligent mower can also be controlled to be returned to a charging station to be charged timely, thus, sufficient power supply is available when in need for work, use reliability is improved and the intelligent mower is convenient to manage.

Figure 32:
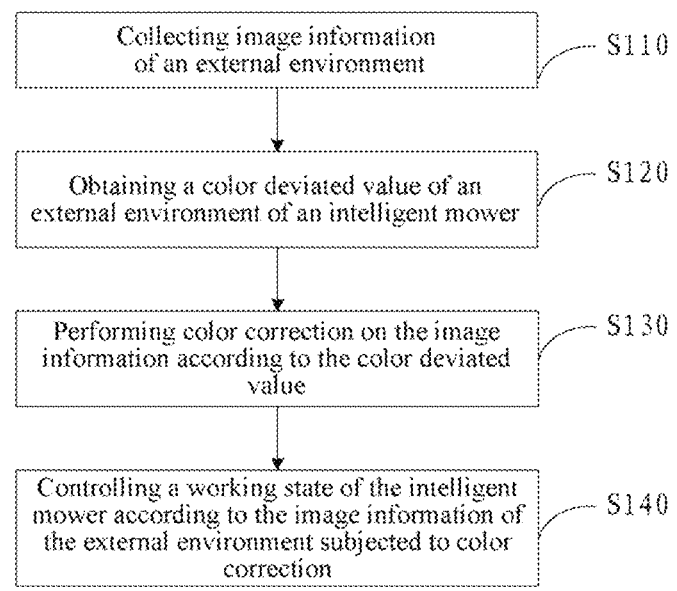
FIG. 32 is a flowchart of a control method for an intelligent mower in one embodiment of the present invention.

Reference is made to FIG. 32, which is a flowchart of a control method for the intelligent mower.

Step S110: capturing image information of an external environment.

Step S120: obtaining a color deviated value of the external environment of the intelligent mower.

The external environment will generate an aberration when subjected to influences such as lighting, reflection, diffusion and the like, then colors imaged by a standard color part will be deviated from the original colors to generate a deviated value, and this deviated value is embodied in the color deviation of the whole external environment.

In the present embodiment, the step S120 specifically comprises:

providing a standard color plate with the color of white or triselected colors of red, green and blue;

collecting image information of the standard color plate with the color of white or triselected colors of red, green and blue;

and comparing the image information of the standard color plate with the color of white or triselected colors of red, green and blue with stored standard colors to obtain a color deviated value.

Step S130: performing color correction on the image information according to the color deviated value.

In the present embodiment, such step specifically comprises adjusting a gain of an RGB channel of the image information according to the color deviated value.

Step S140: controlling a working state of the intelligent mower according to the image information of the external environment subjected to color correction.

when the object in the external environment is target vegetation, the intelligent mower is controlled to be kept in the original direction to continuously work; and when the object in the external environment is not target vegetation, the intelligent mower is controlled to stop working or be subjected to direction adjustment to continuously work.

When the object in the external environment is not target vegetation, there are two kinds of possibilities: one possibility is that when an obstacle such as bush or rocks around the lawn exists in front of the intelligent mower, but the mower still does not finish the mowing work of a whole lawn; the other possibility is that the intelligent mower has reached a corner of the lawn and has finished the mowing work of the whole lawn. In this way, if it is the former possibility, the intelligent mower is controlled to be subjected to direction adjustment to continuously work; and if it is the latter possibility, the intelligent mower is controlled to stop working. Judgment on these two kinds of possibilities is related to working time of the intelligent mower in specific embodiments to some degree.

In the present embodiment, the step S140 specifically comprises the following steps:

extracting image features of the image information;

calculating a similarity between the image features of the image information with standard image features; and judging whether the similarity is larger than or equal to a similarity threshold, if yes, the object in the external environment is target vegetation and the intelligent mower is controlled to be kept in the original direction to continuously work; and if not, the object in the external environment is not target vegetation, and the intelligent mower is controlled to stop working or be subjected to direction adjustment to continuously work.

In other embodiments, when the object in the external environment is judged to be the target vegetation, after the step of controlling the intelligent mower to stop working or be subjected to direction adjustment to continuously work, the method also comprises a step of sending alarm information. In this way, workers can know timely, and use reliability is improved. The alarm device can give out the alarm information, light alarm information, or sound-light alarm information, which can be intuitively known by the workers.

It can be appreciated that in other embodiments, when the external environment is judged to be not the target vegetation, after the step of controlling the intelligent mower to stop working, the method also comprises a step of controlling the intelligent mower to be returned to a charging station for charging timely, thus, sufficient power supply is available when in need for work, use reliability is improved and the intelligent mower is convenient to manage.

According to the intelligent mower and a control method thereof, by disposing a standard color part to obtain the color deviated value of the external environment of the intelligent mower, the image information collected by the image capturing unit can be subjected to color correction according to the color deviated value, thus the image information subjected to color correction will be not deviated from the original true colors, and a misjudgment rate of the vegetation is effectively reduced.

What is claimed is:

1. A self-moving robot, comprising
   a shell,
   a driving module, mounted on the shell and driving the shell to move relative to the ground;
   a working module, mounted on the shell and executing a set working task; and
   a controller, mounted on the shell and connected with and controlling the driving module and working module to work,
   wherein the self-moving robot is characterized by further comprising a light emitter, emitting light in a specific wavelength range to the ground;
   an image capturing device, matched with the light emitter to receive the light in the specific wavelength range to form an image based on the light in the specific wavelength range; and
   the controller comprises a ground type recognizing module, which extracts features in the image to recognize the ground type in the image,
   the self-moving robot characterized in that the self-moving robot is a gardening robot, the ground type recognizing module is a grassland recognizing module, and the ground type in the image recognized by the grassland recognizing module is grassland or non-grassland.

2. The self-moving robot according to claim 1, characterized in that the grassland recognizing module comprises at least one of a dispersion recognizing element, a frequency domain recognizing element and a texture recognizing element.

3. The self-moving robot according to claim 1, characterized in that the image capturing device comprises a light filter layer, which filters light outside the specific wavelength range.

4. The self-moving robot according to claim 1, characterized in that the light emitter is an invisible light emitter.

5. The self-moving robot according to claim 3, characterized in that the light emitter is an infrared light emitter, and the light filter layer is an infrared filter layer.

6. The self-moving robot according to claim 1, characterized in that the light emitter is a laser emitter.

7. The self-moving robot according to claim 6, characterized in that laser emitted from a light source of the laser emitter is emitted away from the self-moving robot from an opening, and a distance between the light source and the opening is larger than or equal to 3 cm.

8. The self-moving robot according to claim 1, characterized in that the light emitter comprises a line light source.

9. The self-moving robot according to claim 1, characterized in that the light emitter and the image capturing device face towards the same area to be recognized on the ground.

10. The self-moving robot according to claim 9, characterized in that the same area to be recognized is located on the ground in front of the shell.

11. The self-moving robot according to claim 1, characterized in that the width of a framing range of the image capturing device is larger than or equal to half of the width of the shell.

12. The self-moving robot according to claim 1, characterized in that a plurality of image capturing devices and/or light emitters are disposed.

13. The self-moving robot according to claim 1, characterized in that an isolating part is disposed between the image capturing device and/or the light emitter and the ground.

14. The self-moving robot according to claim 1, wherein the image capturing device has an exposure time smaller than 0.1 s.

15. The self-moving robot according to claim 1, characterized in that the controller further comprises a driving control element, which controls a driving direction of the driving module according to a recognized result of the ground type recognizing module.

* * * * *